(12) United States Patent
Bennett

(10) Patent No.: US 10,447,837 B2
(45) Date of Patent: Oct. 15, 2019

(54) INTERNATIONAL ONE-WAY RECORDED TRANSMITTER OVER A CELLULAR NETWORK

(71) Applicant: World Emergency Network—Nevada, Ltd., Carson City, NV (US)

(72) Inventor: Christopher Ryan Bennett, St. Petersburg, FL (US)

(73) Assignee: World Emergency Network—Nevada, Ltd., Carson City, NV (US)

( * ) Notice: Subject to any disclaimer, the term of this patent is extended or adjusted under 35 U.S.C. 154(b) by 0 days.

(21) Appl. No.: 15/099,499

(22) Filed: Apr. 14, 2016

(65) Prior Publication Data

US 2016/0309012 A1 Oct. 20, 2016

Related U.S. Application Data

(60) Provisional application No. 62/148,001, filed on Apr. 15, 2015.

(51) Int. Cl.
| | |
|---|---|
| *H04M 1/656* | (2006.01) |
| *H04W 8/26* | (2009.01) |
| *H04M 3/22* | (2006.01) |
| *H04W 60/04* | (2009.01) |

(52) U.S. Cl.
CPC ......... *H04M 1/656* (2013.01); *H04M 3/2281* (2013.01); *H04W 8/26* (2013.01); *H04W 60/04* (2013.01); *H04M 2207/18* (2013.01)

(58) Field of Classification Search
CPC ... H04W 12/02; H04W 63/038; H04W 12/06; H04L 60/30; H04M 3/2281; H04B 7/14
See application file for complete search history.

(56) References Cited

U.S. PATENT DOCUMENTS

| | | | |
|---|---|---|---|
| 5,974,309 | A | 10/1999 | Foti |
| 6,301,246 | B1 | 10/2001 | Shaffer et al. |
| 6,449,474 | B1 | 9/2002 | Mukherjee et al. |
| 6,553,025 | B1 | 4/2003 | Kung et al. |
| 6,931,236 | B2 | 8/2005 | Kaplan |
| 7,181,017 | B1 | 2/2007 | Nagel et al. |
| 7,873,349 | B1 | 1/2011 | Smith et al. |
| 2001/0016037 | A1 | 8/2001 | Fritzinger et al. |
| 2001/0036821 | A1 | 11/2001 | Gainsboro et al. |

(Continued)

FOREIGN PATENT DOCUMENTS

| | | |
|---|---|---|
| CN | 1343425 A | 4/2002 |
| JP | 2007166089 | 6/2007 |

(Continued)

OTHER PUBLICATIONS

PCT International Search Report and Written Opinion for PCT/US16/27615, dated Jul. 15, 2016, 14 Pages.

(Continued)

*Primary Examiner* — Joshua L Schwartz
(74) *Attorney, Agent, or Firm* — Fenwick & West LLP

(57) ABSTRACT

Agencies oftentimes desire to monitor personnel in the field during the course of their duties. To provide flexible monitoring capabilities to agencies, a common mobile device such as a mobile phone is converted for use as a radio-based listening system to collect and transmit audio data. A relay is implemented within the system to pass message communications between the mobile device and a server such that the server can facilitate establishment of sessions for monitoring the mobile device.

20 Claims, 11 Drawing Sheets

(56) References Cited

U.S. PATENT DOCUMENTS

| | | |
|---|---|---|
| 2002/0061100 A1 | 5/2002 | DiCamillo et al. |
| 2002/0181460 A1 | 12/2002 | Strathmeyer et al. |
| 2003/0078041 A1 | 4/2003 | Dikmen et al. |
| 2004/0110465 A1 | 6/2004 | Bedingfield et al. |
| 2004/0152442 A1 | 8/2004 | Taisto et al. |
| 2004/0208307 A1 | 10/2004 | Walker et al. |
| 2005/0111629 A1 | 5/2005 | Carlson et al. |
| 2005/0175165 A1 | 8/2005 | Holder |
| 2005/0180395 A1 | 8/2005 | Moore et al. |
| 2005/0232253 A1 | 10/2005 | Ying et al. |
| 2005/0277407 A1 | 12/2005 | Ahn et al. |
| 2006/0034426 A1 | 2/2006 | Freudenberger et al. |
| 2006/0140200 A1 | 6/2006 | Black et al. |
| 2007/0019618 A1 | 1/2007 | Shaffer et al. |
| 2007/0036127 A1 | 2/2007 | Roosen et al. |
| 2007/0183403 A1 | 8/2007 | Somers |
| 2007/0286389 A1 | 12/2007 | Hyerle et al. |
| 2008/0045186 A1 | 2/2008 | Black et al. |
| 2008/0205626 A1 | 8/2008 | Mandalia et al. |
| 2009/0074156 A1 | 3/2009 | Ku et al. |
| 2009/0119100 A1 | 5/2009 | Akella et al. |
| 2010/0169399 A1 | 7/2010 | Moroney et al. |
| 2011/0002480 A1 | 1/2011 | Smith et al. |
| 2011/0026701 A1 | 2/2011 | Kirchhoff et al. |
| 2011/0046920 A1 | 2/2011 | Amis |
| 2011/0081009 A1 | 4/2011 | Ma et al. |
| 2012/0033081 A1 | 2/2012 | Smith et al. |
| 2012/0134351 A1 | 5/2012 | Ewert et al. |
| 2012/0149350 A1 | 6/2012 | Fan et al. |
| 2014/0080473 A1 | 3/2014 | Bennett |

FOREIGN PATENT DOCUMENTS

| | | |
|---|---|---|
| WO | WO 2013/056156 A1 | 4/2013 |
| WO | WO 2013/185805 A1 | 12/2013 |

OTHER PUBLICATIONS

Patent Cooperation Treaty, International Search Report and Written Opinion, International Patent Application No. PCT/US2012/060102, dated Jan. 11, 2013, 14 pages.

Patent Cooperation Treaty, International Search Report and Written Opinion, International Patent Application No. PCT/US2012/039857, dated Aug. 27, 2012, 13 pages.

Office Action for Japanese Patent Application No. JP 2014-513643, dated Apr. 22, 2014, 4 Pages (With English Translation).

Chinese Office Action, Chinese Application No. 201280036618.2, dated Nov. 25, 2014, x 16 pages (With English Translation).

European Extended Search Report, European Application No. 12791969.4, dated Dec. 12, 2014, 10 Pages.

Wu Xiaohua et al., "Analysis of the Principles of Undercover Software and Study on Operators' Countermeasures," Mobile Communications, Mar. 15, 2011, No. 5, 7 Pages (With English Abstract).

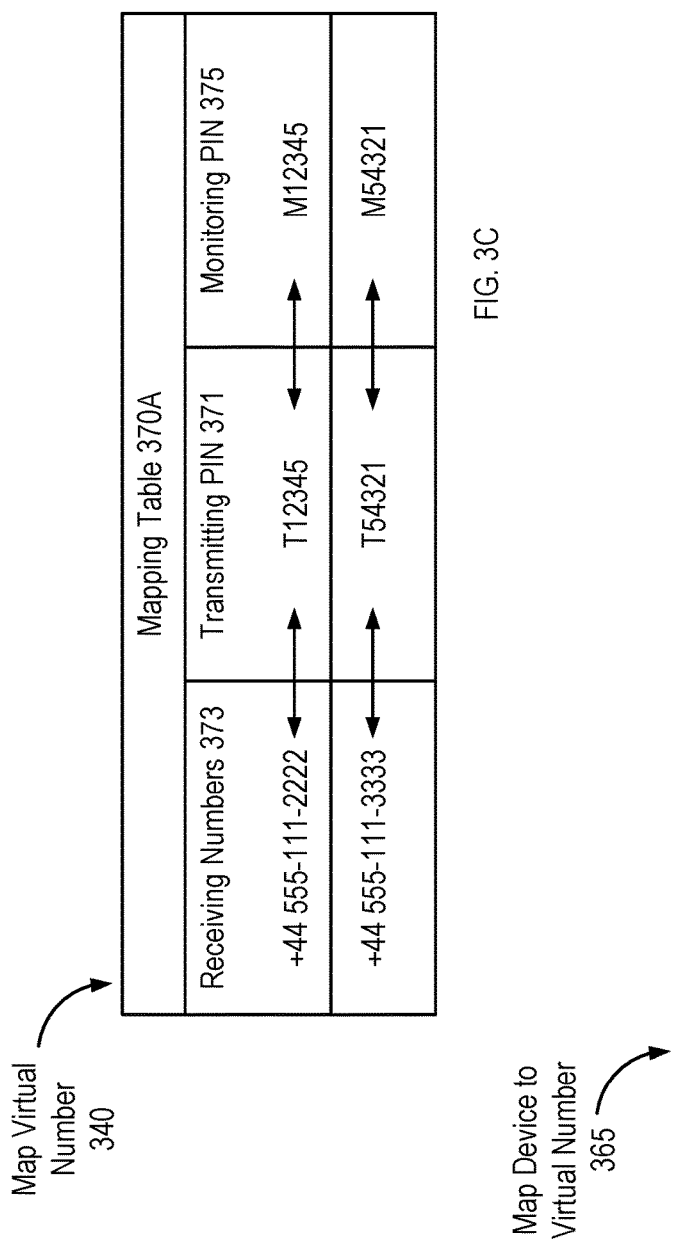

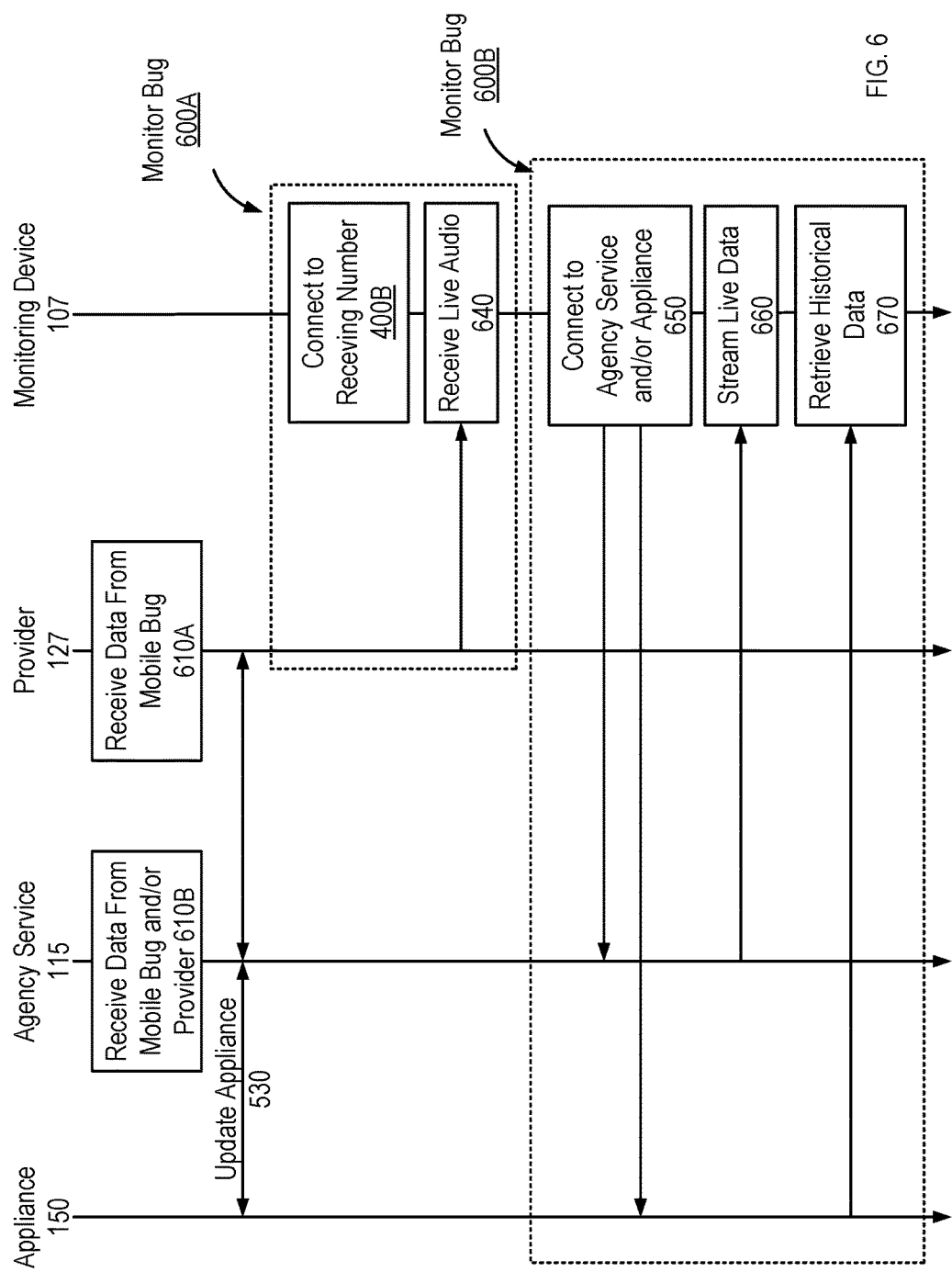

INTERNATIONAL ONE-WAY RECORDED TRANSMITTER OVER A CELLULAR NETWORK

CROSS REFERENCE TO RELATED APPLICATIONS

This application claims the benefit of U.S. Provisional Application No. 62/148,001, filed Apr. 15, 2015, which is incorporated by reference herein in its entirety.

BACKGROUND

1. Field of Art

The present disclosure generally relates to the field of undercover operations and more specifically to using a mobile phone as an undercover device.

2. Background of the Invention

Police officers and other agents "operators" oftentimes conduct investigations in the field during the course of their duties. In many cases, these investigations require direct support and oversight at an administrative level. For example, an operator conducting an undercover sting in a high-risk situation may have a support team monitoring the operator directly in the field and interfacing with administration at an agency. Traditionally, the operator would use a radio-based covert listening system that can be hidden (e.g., under a shirt) or otherwise embedded (e.g., in or on an electronic device or object) to conceal its nature and protect operators' cover. The listening device would then transmit audio data back to the support team, which would relay data back to the agency.

However, with widespread publicity of listening devices in movies and the like, the physical nature of a given device can lead to its discovery or detection, which poses additional risks for the operators themselves. Additionally, traditional bugs have other inherent deficiencies when used in the field, such as requiring line-of-sight or physical proximity to a base station and the support team. Although some newer bug systems seek to provide sufficient concealability among other desirable features, they are oftentimes prohibitively expensive and yet, still fail to mitigate the above deficiencies. Furthermore, such systems are not rapidly deployable as they typically require support personnel other than immediate backup.

SUMMARY

The above and other issues are addressed by a method and computer system for configuring a telephonic device as a one-way recorded transmitter (mobile bug). An embodiment of the method comprises receiving a request for a virtual number from an intermediate telephonic device (relay). In response to the request for the virtual number, the virtual number is provisioned and a PIN is generated. The PIN is associated with the virtual number and transmitted to the relay. A registration request for the mobile bug is received from the relay and includes the PIN and device information, such as a transmitting number, for the mobile bug. The virtual number is identified based on the PIN. Responsive to identifying the virtual number based on the PIN, the received device information for the mobile bug is stored in association with the virtual number. An activation request for the mobile bug is received from the relay. In response to the activation request for the mobile bug, the method further includes transmitting instructions for connecting the mobile bug to the virtual number to permit monitoring of the mobile bug. Outgoing audio to the mobile bug is disabled. In an embodiment, the activation request includes the PIN and/or the device information for the mobile bug associated with the virtual number. In turn, the virtual number is identified based on the received PIN and/or the received device information included in the activation request.

In an embodiment, the relay and the mobile bug are associated with a first telephony network and the virtual number is provisioned with a second telephony network, the instructions for connecting the mobile bug to the virtual number comprising instructions to dial out to the mobile bug from the virtual number to establish a connection through the virtual number.

In some embodiments, the method further comprises configuring a second telephonic device as a monitoring device. A registration request for the monitoring device is received from the relay and includes device information, such as a transmitting number, for the monitoring device. The registration request for the monitoring device may include a second PIN, different from the first PIN, to distinguish the registration request for the mobile bug from the registration request for the monitoring device. In an embodiment, the second PIN for monitoring is generated, associated with the virtual number, and transmitted to the relay. The virtual number is identified based on the second PIN. Responsive to identifying the virtual number based on the PIN, the received device information for the monitoring device is stored in association with the virtual number. The method further comprises transmitting, in response to receiving the activation request for the mobile bug, instructions for connecting the monitoring device to the virtual number to receive audio transmitted by the mobile bug. In an embodiment, the instructions for connecting the monitoring device to the virtual number comprise instructions to dial out to the monitoring device from the virtual number to establish a second connection through the virtual number. The audio is transmitted by the mobile bug over the first connection established through the virtual number and the monitoring device receives the audio on the second connection established through the virtual number.

An embodiment of the system comprises a server having a one or more processors and a non-transitory computer-readable storage medium storing computer program code. When executed, the computer program code causes the server to receive a request for a virtual number from an intermediate telephonic device (relay). In response to the request for the virtual number, the server provisions the virtual number and generates a PIN. The PIN is associated with the virtual number and transmitted to the relay. A registration request for the mobile bug is received from the relay and includes the PIN and device information, such as a transmitting number, for the mobile bug. The virtual number is identified based on the PIN. In response to identifying the virtual number based on the PIN, the received device information for the mobile bug is stored in association with the virtual number. An activation request for the mobile bug is received from the relay. In response to the activation request for the mobile bug, the server further includes computer program code to transmit instructions for connecting the mobile bug to the virtual number to permit monitoring of the mobile bug. Outgoing audio to the mobile bug is disabled. In an embodiment, the activation request includes the PIN and/or the device information for the mobile bug associated with the virtual number. In turn, the server identifies the virtual number based on the received PIN and/or the received device information included in the activation request.

In an embodiment, the relay and the mobile bug are associated with a first telephony network and the virtual number is provisioned with a second telephony network, the instructions for connecting the mobile bug to the virtual number comprising instructions to dial out to the mobile bug from the virtual number to establish a connection through the virtual number.

In some embodiments, the server further comprises computer program code to configure a second telephonic device as a monitoring device. A registration request for the monitoring device is received from the relay and includes device information, such as a transmitting number, for the monitoring device. The registration request for the monitoring device may include a second PIN, different from the first PIN, to distinguish the registration request for the mobile bug from the registration request for the monitoring device. In an embodiment, the second PIN for monitoring is generated, associated with the virtual number, and transmitted to the relay. The virtual number is identified based on the second PIN. In response to identifying the virtual number based on the PIN, the received device information for the monitoring device is stored in association with the virtual number. The server further comprises computer program code to transmit, in response to receiving the activation request for the mobile bug, instructions for connecting the monitoring device to the virtual number to receive audio transmitted by the mobile bug. In an embodiment, the instructions for connecting the monitoring device to the virtual number comprise instructions to dial out to the monitoring device from the virtual number to establish a second connection, the monitoring device receiving audio on the second connection from the first connection established through the virtual number with the mobile bug.

BRIEF DESCRIPTION OF THE DRAWINGS

The teachings of the embodiments can be readily understood by considering the following detailed description in conjunction with the accompanying drawings.

FIGS. 3C and 3D are tables illustrating example embodiments of virtual number mapping for operating and monitoring a mobile bug.

FIG. 6 is an interaction diagram illustrating a method for monitoring a mobile bug according to one example embodiment.

DETAILED DESCRIPTION

Figure 1A:
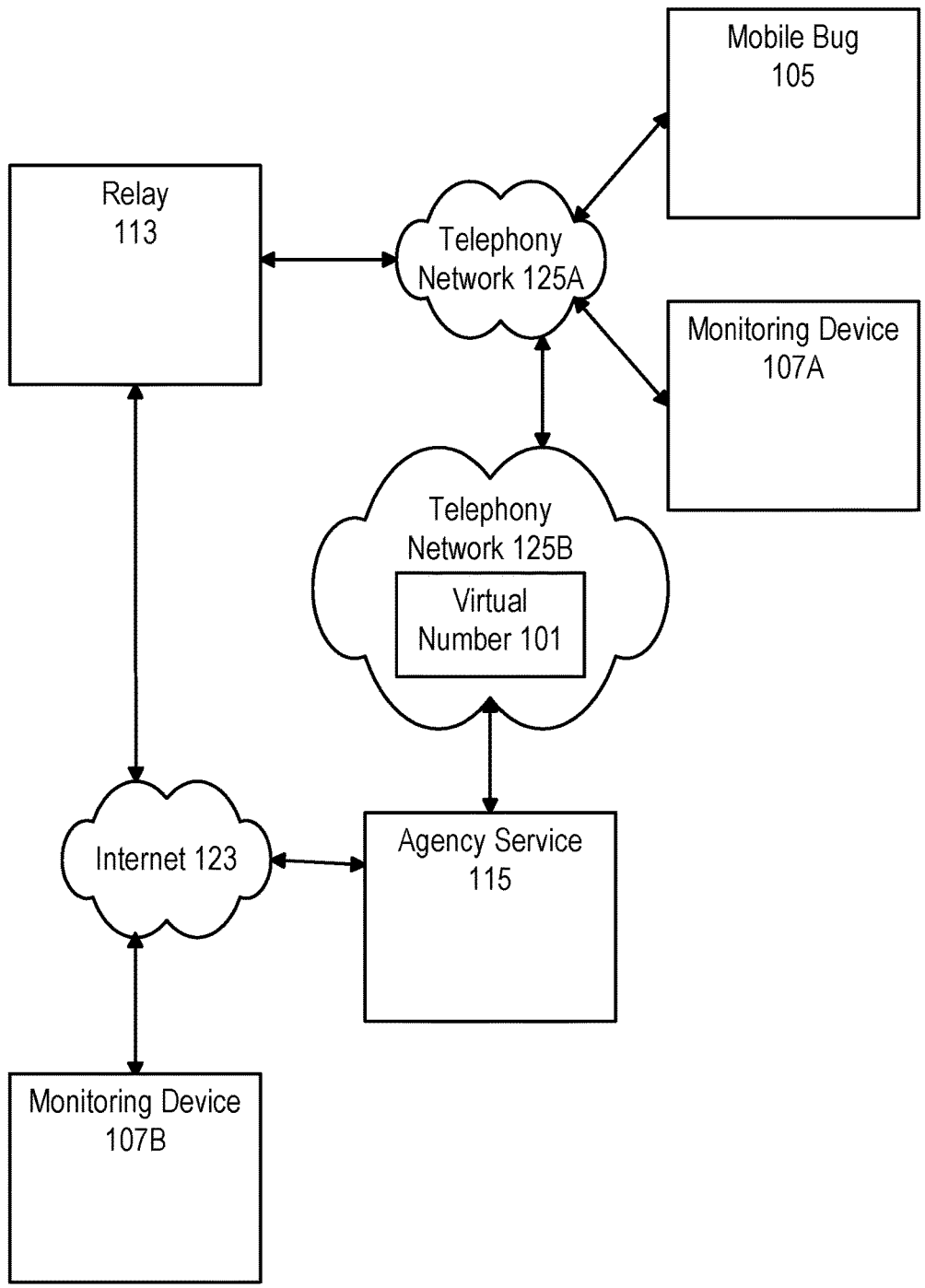
FIGS. 1A and 1B are block diagrams illustrating an environment for implementing a system for a mobile phone as a one-way recorded transmitter "mobile bug" activated through a relay according to example embodiments.

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

Overview

Many operators in the field posses a personal mobile phone or are issued a mobile phone by their agency or department. Oftentimes a traditional bug and accompanying support team are unavailable to support an operator in the field or are not appropriate for a given scenario. However, the agency may still desire to monitor and/or record the operator's activities. Accordingly, the agency may coordinate with an agency support service to provide configuration of the operator's mobile phone to fulfill the role of a traditional bug. The configuration can take place over-the-air such that a given mobile phone is conveniently converted as needed. In some instances, the mobile phone requires nothing more than a radio connection. If the agency desires to monitor additional operators, additional mobile phones may be converted. Monitoring devices, embodiments of which may also be mobile phones, may also be configured to monitor the mobile phone of the operator. As such, agency personnel in the field may monitor activities of the operator when the operator's mobile phone is activated through the agency service.

Example embodiments described herein relate to configuring a wireless radio network (e.g., Cellular Network and/or WiFi) capable device, such as a mobile phone, as a one-way recorded transmitter or "mobile bug" for use in the field. As mobile phones and similar devices are commonly carried by operators during the course of undercover investigations, mobile phones offer an existing platform for transmitting data wirelessly. Use of such devices as a mobile bug often allows the mobile bug to be concealed "in plain sight" as a direct result of the devices' popularity and utility. Additionally, with the popularity of smart phones and feature phones, additional monitoring and safety features are integrated into the mobile bug for enhancing operational viability in the field.

Furthermore, because a mobile phone configured as a mobile bug communicates information over existing channels created for the phone's intended purpose, the mobile bug, if examined, at worst appears to operate as expected (e.g., receives and/or transmits wireless data). Accordingly, the worst case scenario for an operator is having to "turn-off" the mobile bug rather than having their cover blown. Additionally, by turning a mobile phone into a covert transmitting device and using a cellular network as the means of transmission, the mobile bug system offers a virtually unlimited range of transmission and the ability to collect a wide range of valuable real-time data. Real-time data collected by the mobile bug may include audio, video or still images, Global Positioning System ("GPS") coordinates, etc.

The mobile bug subsequently transmits all or a portion of the collected real-time data wirelessly over the existing channels (e.g., a network) back to the agency, agency service or another entity. Embodiments of the agency, agency service and/or other entities within the mobile bug system receive the collected data for storage and/or live streaming to monitoring devices. Depending on the embodiment, the monitoring devices are further configured to access and present (e.g., play and/or display) a variety of the real-time and historical data stored on or streamed by the entities on the network. For example, the monitoring devices may access a web interface, API or execute a standalone application for viewing mobile bug details and the collected information. In some embodiments, the monitoring devices may access portions of the real-time data via a provided monitoring line configured for maintaining the operator's cover. Furthermore, other agencies with appropriate credentials and monitoring devices may similarly access portions of the collected information during inter-agency investigations.

Environment and Implementation of the Mobile Bug System

FIG. 1A is a block diagram illustrating an environment 100a for implementing a system for a mobile phone as a one-way recorded transmitter "mobile bug" activated through a relay according to an example embodiment. As shown the environment 100a includes networks such as telephony network 125A, telephony network 125B, and internet 123.

Most, if not all, countries include communication infrastructure such as a telephony networks 125 and internet 123. However, the sophistication and interoperability between the networks of different countries may differ greatly. For example, while inbound and outbound calls may be completed between telephony network 125A and telephony network 125B, other well known communication types such as messages, e.g., on a short message service (SMS) and multimedia message service (MMS), though supported within the networks separately, may not be completed between the networks. As an example, a message originating from a device on network 125A may not be received by a device on network 125B and vice versa. In another example, telephony network 125B may support virtual numbers 101 and telephony network 125A may not. Additionally, in instances where caller ID information is used by the agency service 115 to distinguish between different telephonic devices dialing a virtual number, a telephony network (e.g., 125A) may be unable to pass reliable caller ID information to the agency service (regardless of which network the virtual number is associated with) for the telephonic devices. As such, additional information input from the user of a telephonic device dialing the virtual number may be required for the agency service 115 to identify the device, even if telephony network 125A supports virtual numbers. These shortcoming present difficulties for personnel in the field and/or configuration of telephonic devices as mobile bugs and/or monitoring devices.

In order to mitigate the above shortcomings, a relay 113 is coupled to the telephony network 125A for supporting the configuration of mobile bugs and monitoring devices on the telephony network 125A. The relay 113 passes information and instructions received from devices coupled to the telephony network 125A to the agency service 115 and vice versa. Example embodiments of the relay 113 can include telephonic devices with connectivity to the internet 123 and the telephony network 125A. The coupling to telephony network 125A supports communication with other telephonic devices coupled to the telephony network 125A. The coupling to internet 123 support communication with the agency service 115. Accordingly, the relay 113 facilitates communications between telephonic device on the telephony network 125A and the agency service 115. For ease of deployment, the relay 113 may be a mobile phone or other mobile device capable of receiving and transmitting messages on services such as SMS and MMS over telephony network 125A and capable of internet 123 connectivity to communicate with the agency service 115. In an embodiment, the relay 113 passes messages received on the telephony network 125A to the agency service 115 via the internet 123. Additionally, the relay 113 may receive messages for transmission from the agency service 115 via the internet 123 and, in turn, transmit the messages on the telephony network 125A. Thus, generally, the relay 113 can be embodied as any device with connectivity to the agency service 115 and that the mobile bug 105 and monitoring device 107A can send and receive messages with (e.g, over a telephony network 125A and/or the internet 123)

For example, in some embodiments, the relay 113 may be implemented as a bot on a server, such as an Internet bot, web robot, WWW robot or simply bot. A bot implemented on a server may be a software application that automated tasks over the Internet. For example, a bot configured as a relay 113 includes the ability to send and receive messages to and from devices such as mobile bugs 105 and monitoring devices 107 and transmit those messages over the Internet to the agency service 123. In one embodiment, a bot configured as a relay 113 may be implemented within popular over-the-top messaging (OTT) applications such as TELGRAM, WHATSAPP, FACEBOOK MESSENGER, or other messaging application. Bots, like users, are traditionally addressable over these networks by usernames, such as "@RelayBot." As bots are implemented virtually as software applications, a bot configured as a relay 133 may remove the need for a physical relay 113 device coupled to a telephony network 125A, providing the devices 105, 107A include connectivity to the internet 123 through their telephony network 125A. Accordingly, where these conditions are met, a bot configured as a relay 113 may enable instant global deployment of a mobile bug 105 without requiring configuration of a physical relay device coupled to telephony network 125A. In the context of the system described herein, a device used as the mobile bug 105 and/or monitoring device may launch an OTT application such as TELEGRAM, compose a new message within the OTT application and transmit the message to the user name (e.g., "@RelayBot") of the bot configured as a relay to perform actions in a manner similar to that of transmitting the message over SMS. Similarly, the device may receive a response back from the bot configured as the relay, but within the OTT application rather than via SMS. The bot configured as the relay 113 may transmit the messages received from the mobile bug 105 and/or monitoring device 107A back to the agency service 115 (e.g., over the internet 123, either outside or within the OTT messaging application) and receive instructions for transmitting messages to the mobile bug 105 and/or monitoring device 107A back from the agency service 115. As can be seen, the relay 113 may be implemented in a variety of way to overcome difficulties that arise in supporting mobile bugs 105 and/or monitoring device 107 operations abroad.

The agency service 115 is coupled to the internet 123 and the telephony network 125B. One or more mobile bugs 105 and monitoring devices 107A may be coupled to the telephony network 125A, and are configured through the relay 113. Monitoring devices 107 and mobile bugs 105 may also connect to the internet 123, and other monitoring devices (not shown) may also be coupled to the telephony network 125B. For example, monitoring device 107B as shown is coupled to the internet 123. An agency (not shown) may communicate with the agency service 115 (e.g., via the internet 123 or other network) to retrieve information relative to operations conducted with the mobile bug 105. For example, the agency may retrieve recordings and other data collected by the mobile bug 105.

Agency service 115 represents a collection of compute devices (e.g., servers) and related storage mediums that are used to execute module for performing various activities such as configuring mobile bugs 105, configuring mobile devices 107, exchanging data over the networks 123, 125 and storing data in support of one or more agencies, monitoring devices, and operated mobile bugs. For example, the agency service 115 may include one or more modules providing ascribed functionality to an agency and monitoring devices via an application programming interface ("API") or web interface, collectively "the monitoring interface", as described in more detail with reference to FIG. 1C. The agency service 115 may also include infrastructure for providing audio and video communicability (e.g., internally and/or over a network) within the monitoring interface using the public switched telephone network ("PSTN"), voice over internet protocol ("VoIP") and video conferencing services.

The mobile bugs 105 are oftentimes mobile telephonic devices capable of collecting data and transmitting data (e.g., wirelessly) over the telephony network 125A. Additionally, some mobile bugs 105 may include connectivity to the internet 123 to transmit collected data to the agency service 115 in real-time or when a connection to the internet becomes available. Some examples of a mobile bug 105 include a mobile phone, tablet or notebook computer. Example embodiments of the mobile bug as a mobile phone include feature phones, smart phones or standard mobile phones. Accordingly, a given mobile phone or other device operated as a mobile bug 105 may not necessarily include or support all of the functionality ascribed herein to the mobile bug or mobile bug system due to inherent differences in device capabilities. In some embodiments, other telephonic devices such as land-line phones are used.

In one embodiment, the mobile bug 105 executes a bug module for collecting data, transmitting data and maintaining a persistent connection for transmitting audio and/or other collected data. An example embodiment of a bug module is described in more detail with reference to FIG. 2.

In addition to the mobile bugs 105, a number of monitoring devices 107 may connect to an available network 123, 125 to obtain or present data collected from one or more of the mobile bugs. Depending on the embodiment, a monitoring device 107 is a telephonic device that can be operated within the agency or externally in the field. As referred to herein, a monitoring device 107 is a mobile or stationary telephonic device capable of connectivity (e.g., wireless or wired) to a network such as an internal agency network, the internet 123, PSTN and/or cellular network 125. Some examples of a monitoring device 107 include a mobile phone, land-line phone, tablet and notebook or desktop computer.

Example embodiments of the monitoring device 107 as a mobile phone can include feature phones, smart phones or standard mobile phones. Accordingly, a given mobile phone or other device operated as a monitoring device 107 does not necessarily include or support all of the functionality ascribed herein to the monitoring device or the mobile bug system due to inherent differences in device capabilities. In one example embodiment, the monitoring device 107 executes a monitoring module for interfacing with entities on a network 123, 125 to manage mobile bugs 105 and view collected data.

As used herein, the term "module" refers to computer program instructions and/or other logic used to provide the specified functionality. Thus, a module can be implemented in hardware, firmware, and/or software. In one embodiment, program modules formed of executable computer program instructions are stored on a non-transitory storage device, loaded into memory, and executed by a computer processor as one or more processes.

Figure 1B:
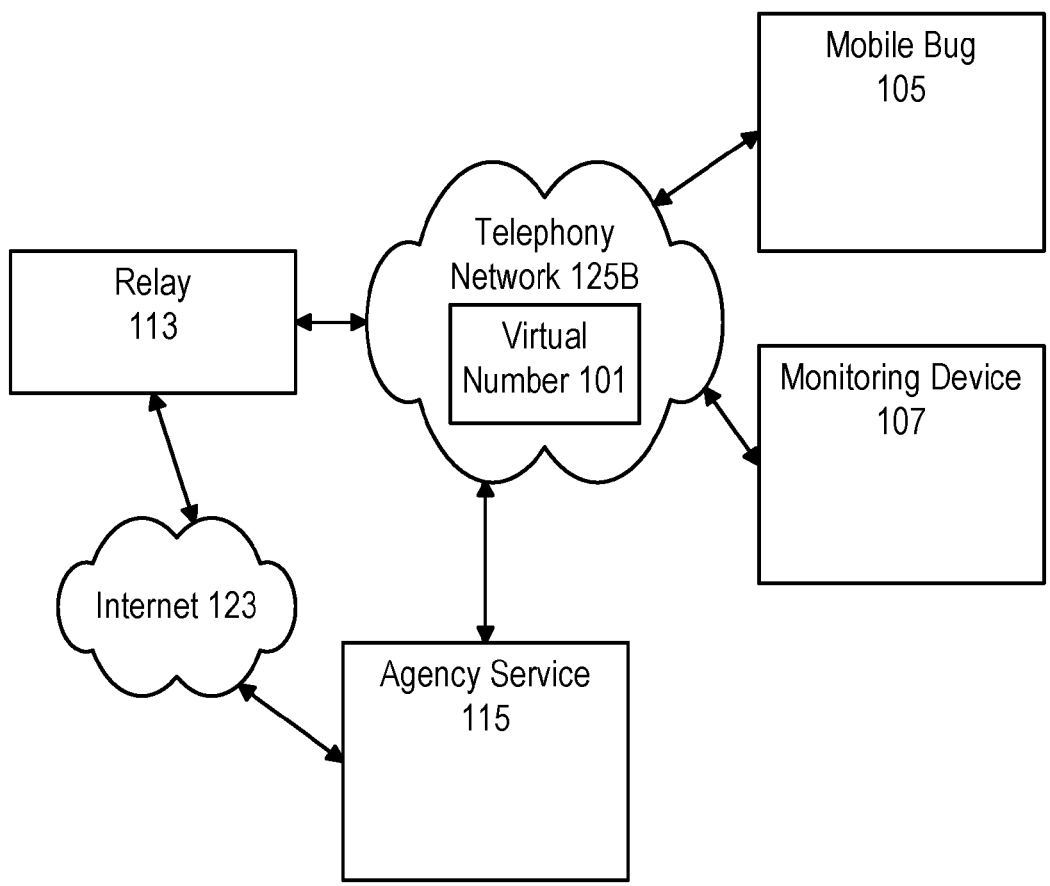

FIG. 1B is a block diagram illustrating an environment 100b for implementing a system for a mobile phone as a one-way recorded transmitter "mobile bug" activated through a relay according to an example embodiment. As shown, the environment 100b includes a telephony network 125B, where virtual numbers 101 are available, that couples relay 113, mobile bug 105, monitoring device 107, and agency service 115. The embodiment of FIG. 1B differs from that of FIG. 1A in that the relay 113 need not be implemented to support mobile bug 105 and monitoring device 107 operation on a telephony network other than telephony network 105B. However, similar to the embodiment of FIG. 1A, the relay 113 may be implemented to enable mobile bug 105 and monitoring device 105 operation via message communications through the relay 113 where an agency prefers such operation. Accordingly, the relay 113 may pass messages between the devices and the agency service 115 via the internet 123 and/or the telephony network 125B in a fashion similar to that described with reference to FIG. 1A. Additionally, in the configuration of FIG. 1B, the agency service 115 may include the relay 113 and/or utilize a virtual number 101 provisioned with a provider to mimic relay functionality by instructing the provider of the virtual number to the perform functions of the relay through the virtual number.

Figure 1C:
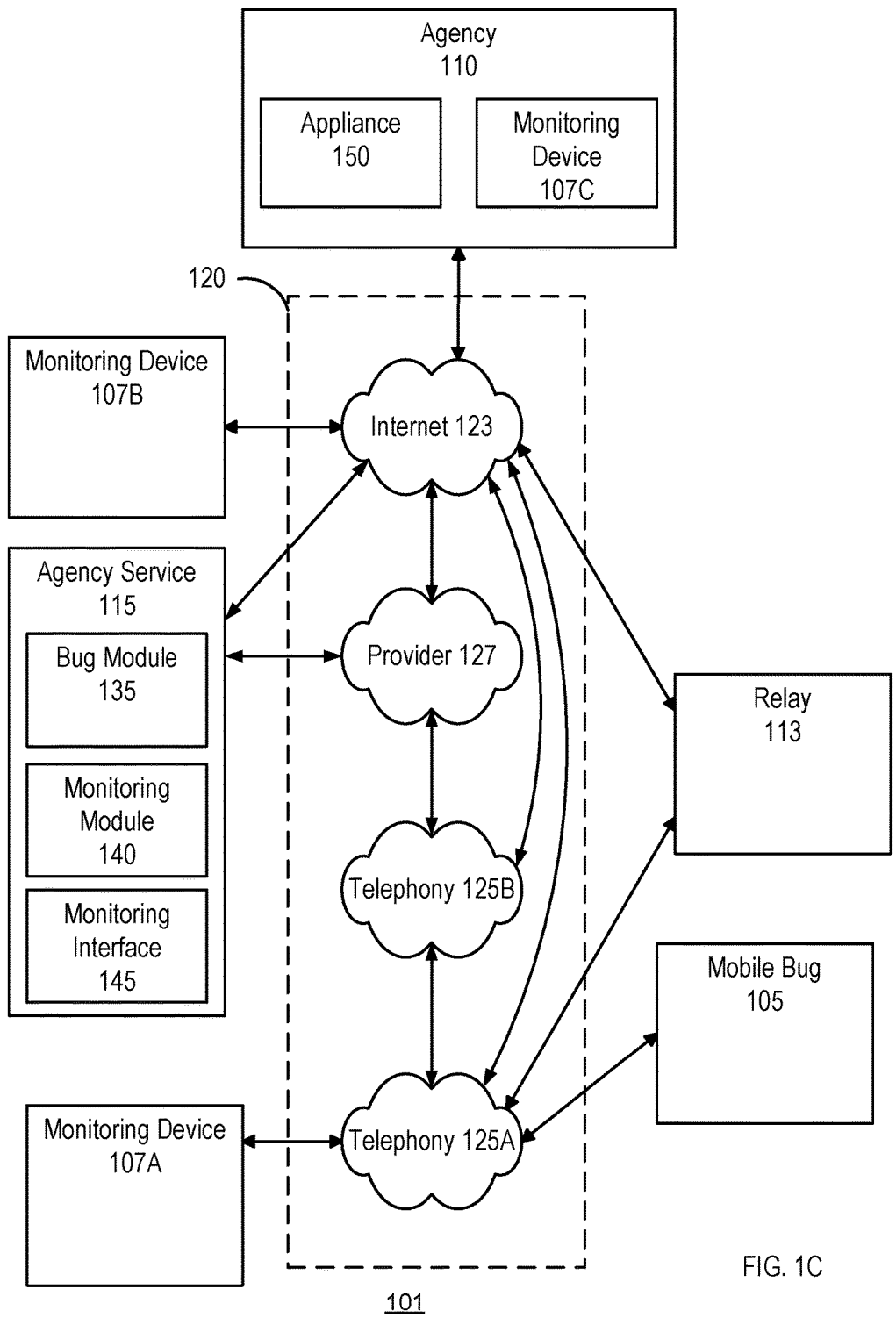
FIG. 1C is a block diagram illustrating an operating environment of a mobile bug activated through a relay according to an example embodiment.

FIG. 1C is a block diagram illustrating an operating environment 101 of a mobile bug 105 activated through a relay 113 according to an example embodiment. As shown, the operating environment 101 includes a network 120 with components such as the internet 123, telephony 125 and provider 127 networks. The network 120 may also include GPS satellites (not shown) that transmit position data to mobile bugs 105 and other devices.

The network 120 represents the communication pathway between relay 113, agencies 110, agency services 115, mobile bugs 105, monitoring devices 107 and other entities (not shown). In one embodiment, the network 120 includes standard communications technologies and/or protocols and can include the Internet and PSTN. Oftentimes, these communications technologies and/or protocols carry both PTSN and Internet related data. Thus, the network 120 can include links using technologies such as Ethernet, 802.11, worldwide interoperability for microwave access (WiMAX), 2G/3G/4G mobile communications protocols, worldwide interoperability for PSTN communications, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including analog audio (e.g., for last mile PSTN communications), digital audio and video (e.g., as a file or streaming with Real Time Streaming Protocol), the hypertext markup language (HTML), the extensible markup language (XML), JavaScript, VBScript, FLASH, the portable document format (PDF), etc. In addition, all or some of the data exchanged over the network 120 can be encrypted using conventional encryption technologies such as secure sockets layer (SSL), transport layer security (TLS), virtual private networks (VPNs), Internet Protocol security (IPsec), etc. In another embodiment, the entities on the network 120 can use custom and/or dedicated data communications technologies instead of, or in addition to, the ones described above. For example, some government agencies and the military may operate networks auxiliary to the internet and PSTN.

The telephony networks 125A, 125B may include servers, switches and other hardware and software for implementing, among other protocols and technologies, worldwide interoperability for PSTN communications including land-lines and 2G/3G/4G wireless protocols. The telephony networks 125A, 125B may also provide mobile devices with the capability to transmit and receive data over the internet 123. A telephony network 125 (e.g., 125B) may managed by one or more communication service providers "CSPs" (not shown) that own telephone numbers for use on the PSTN and the CSPs own network (e.g., a wireless network that communicates with the PSTN). However, as described previously, in instances where the capabilities of telephony network 125B and telephony network 125A differ, relay 113 may be implemented to facilitate configuration of mobile bugs 105 and monitoring devices 107A on the telephony network 125A. Thus, the agency service 115 can manage activation of the mobile bug 105 and monitoring of the mobile bug on one telephony network 125A through another telephony network 125B and the provider 127 associated with telephony network 125B.

The provider 127 may include servers, switches and other hardware and software for communicating over the network 120 with CSPs and other entities. The provider 127 buys or leases numbers for use on the telephony network 125B from multiple CSPs. The provider 127, in turn, manages numbers provisioned for use by the agency service 115 and the telephony traffic associated with the numbers on telephony network 125B. In one embodiment, the agency service 115 provisions one or more of the numbers as virtual numbers with the provider 127 over the network 120.

Typically, a number used on the telephony network 125 directs to a given mobile device, VoIP device or land-line device having an associated number identity characterized by automatic number identification "ANI" information, or caller identification. In the case of virtual numbers provisioned for use on telephony network 125B, the virtual numbers, while still operable with the PSTN and CSP networks, are associated with the provider 127 who handles telephony traffic for the number. Because a virtual number does not direct to an end user device, the provider 127 may establish connections with devices dialing into the virtual number, establish connections with devices by dialing out to the devices from the virtual number, record call information such as call audio and caller history (e.g., on a computer readable medium) and stream/provide call information for download (e.g., over the network 120 such as via the internet 123).

The provider 127 may also pass/bridge audio (bidirectional or unidirectional) in real-time between two or more telephonic devices with connections established through the virtual number (or connected with the provider 127 via a virtual number). Additionally, as the virtual numbers are handled by the provider 127, the agency service 115 may modify ANI information and caller identification associated with the virtual number.

In addition to provisioning virtual numbers for the agency service 115, the provider 127 communicates notifications and data associated with the virtual numbers to the agency service 115 or other entity such as the agency 110. For example, the provider 127 may notify the agency service 115 of an incoming call from a device to the virtual number and receive instructions from the agency service 115 to connect the device to the virtual number. The provider 127 may also receive instructions from the agency service 115 to dial out to a device such as the mobile bug 105 or monitoring device 107 from the virtual number. Additionally, the provider 127 may receive instructions to stop/start recordings of audio associated with the mobile bug 105 and/or monitoring the mobile bug 105 on the virtual number and interface with a transcription service to transcribe call audio. In turn, the provider 127 can transmit the recordings and transcripts to the agency service 115 or other entity on the network 120. In addition, the provider 127 may pass messages received at the virtual number to the agency service 115 and receive instructions for transmitting messages from the virtual number from the agency service 115.

Additionally, the provider 127 may enable or disable inbound and/or outbound audio for different parties being connected to the virtual number and recordings thereof responsive to instructions received (e.g., via an API) from the agency service 115. The provider 127 can receive instructions for managing a virtual number as part of the provisioning process, prior to an incoming call or outbound call on the virtual number, or in real-time from the agency service 115 when connecting a device through the virtual number. In some embodiments, the provider 127 communicates directly with the agency 110 to provision virtual numbers, transmit notifications and data or receive instructions, in which case the agency 110 may incorporate the functionality of the agency service 115. Additionally, the provider 127 itself may function as a CSP and vice versa.

In an embodiment, the agency service 115 receives requests for provisioning a virtual number and registering mobile bugs 105 and/or monitoring device 107A with the virtual number through the relay 113. The requests may originate from a telephonic device such as the mobile bug 105 or monitoring device 107A, which the relay 113 passes to the agency service 115. The agency 110 and other monitoring device 107B, 107C may also provision virtual numbers through an API with the agency service 115. The requests can include number information for provisioning virtual numbers such as an area code (e.g., 555), country code (e.g., +44) and/or associated CSP. In some embodiments, the agency service 115 determines the number information for the virtual number based on the number information associated with the relay 113 and/or requesting device. In turn, the agency service 115 queries the provider 127 for available virtual numbers matching the number information corresponding to the request. The agency service 115 subsequently receives available virtual numbers from the provider 127 and claims a virtual number with the desired number information from the provider 127. The agency service 115 generates one or more PINs for registering devices with the virtual number. For example, the agency servicer 115 may generate a transmitting PIN and a monitoring PIN for registering a telephonic device as either a mobile bug (transmitter) or a monitoring device (monitor).

The agency service 115 transmits the registration PINs to the relay 113, which in turn transmits a message including the PINs and information for the virtual number (e.g., the number information for the virtual number) to the telephonic device (e.g., the mobile bug 105 or monitoring device 107A) having requested provisioning of the virtual number. The relay 113 may subsequently receive a registration request message from a telephonic device. The registration request message may include content such as a PIN to register the telephonic device or other telephonic device with the virtual number. The message identifies the registration request for the telephonic device as a request for registering either a monitoring device 107A or mobile bug 105 (e.g., by the provided PIN) and includes identifying device information, such as number information and/or transmitting number for the monitoring device 107A or mobile bug 105. The device information for the requesting telephonic device such as transmitting number and associated number information may be included in message header information (e.g., "from" field) or identified in the contents of the message. The relay 113 passes the received message (e.g., including header information and content) to the agency service 115 to register a mobile bug 105 and/or monitoring device 107A with the virtual number.

In some embodiments, a PIN is an authorization code included in the content of the message for authorizing registration of a device with the virtual number. In some embodiments, a unique monitoring PIN for monitoring devices and transmitting PIN for a mobile bug are generated such that a user of either device need only include the appropriate PIN in a message transmitted to the relay from the corresponding device to register with the virtual number. In other embodiments, a single PIN may be generated and additional content (e.g., "bug" or "monitor" indicator) of the message indicates how the requesting device should be registered. In some embodiments, where the requesting device desires to register another device as either a mobile bug 105 or monitoring device 107, device information such as the transmitting number for the other device may be included as content in addition to the corresponding PIN or single PIN and bug/monitor indicator.

The agency service 115 may optionally allow an entity on the network 120 to specify ANI and/or caller identification associated with the virtual number to spoof the number's identity on the network 120. The agency service 115, in turn, transmits instructions to the provider 127 for modifying the number identity. The agency service 115 may optionally verify the spoofed number identity. When a virtual number is no longer needed by the agency 110, the agency service 115 obtains any audio recordings or call logs associated with the virtual number and releases the number back to the provider 127.

In one embodiment, the agency service 115 stores mapping information for virtual numbers in a mapping table. The mapping information for a virtual number may include number information for the virtual number, one or more generated PINs, and device information for mobile bugs and monitoring devices registered with the virtual number. For example, the mapping information may include a virtual number, one or more authorization PINs for registering a device with the virtual number, the transmitting number of a registered mobile bug 105 and/or and monitoring device 107, and a device identifier indicating whether the device is registered mobile bug or monitoring device (which in some embodiments, may be implied by a PIN prefix and/or suffix). Thus, for example, the agency service 115 stores mapping information for provisioned virtual number in response to received requests for virtual numbers and in response to registration requests associated with the virtual number. In turn, the agency service 115 may determine, from the mapping table, the virtual number and/or devices to which connections should be established to/from during an operation. One example mapping may specify a claimed virtual number for use as a virtual number (receiving number) for a mobile bug 105 to be connected with in order to transmit collected data (e.g., audio) over a telephony network (e.g., 125A). Additionally, the mapping for the receiving number may specify one or more monitoring devices 107 permitted to monitor the mobile bug 105, and to which connections may be established with through the virtual number when the mobile bug begins transmitting collected data. As multiple monitoring devices 107A, 107B, 107C may monitor a mobile bug 105 registered with a receiving number, the agency service 115 may register multiple monitoring devices with the receiving number and by storing multiple transmitting numbers of monitoring devices in association with the receiving number in the mapping table.

In practice, agency service 115 consults the mapping table to automatically identify a receiving number associated with a registered mobile bug 105 requesting to activate a session where data is collected from the mobile bug 105. The agency service 115 may receive the request to activate the session in the form of a message originating from the mobile bug 105 and passed (e.g., with message header information and message content) to the agency service by the relay 113. For example, in response to receiving a request to activate a mobile bug 105, the agency service 115 identifies the corresponding receiving number and transmits instructions to a provider 127 causing the mobile bug 105 to receive a connection request from the identified receiving number. The agency service 115 may additionally instruct the provider 127 to configure the connection such that outbound audio to the mobile bug 105 is disabled. Accepting the connection request at the mobile bug 105 activates the session. Additionally, the agency service 115 may consult the mapping table to automatically identify one or more monitoring devices 107 registered with the receiving number, and thus permitted to monitor the session in real-time and/or receive the collected data from the session. In turn, in response to receiving the request to activate the mobile bug 105, the agency service 115 may transmit instructions to the provider 127 causing the one or more registered monitoring devices 107 to automatically receive a connection request from the identified receiving number. In turn, a monitoring device 107 may accept the connection request to monitor the active session.

Personnel with a registered monitoring device 107 that desire to monitor the mobile bug 105 with a mobile or land-line phone in the field may also transmit a request to monitor a session (which may be ongoing) to the relay 113, in which case the agency service 115 identifies the receiving number associated with the registered monitoring device 107 and transmit instructions to the provider 127 causing the registered monitoring devices 107 to receive a connection request from the identified receiving number to monitor the active session. In many cases, a monitoring device 107 may be utilized to monitor multiple mobile bugs 105. Accordingly, the request to monitor a session may include a monitoring PIN associated with the receiving number and/or the receiving number the monitoring device 107 desires to monitor such that the agency service 115 may identify a specific receiving number from multiple ones the monitoring device 107 is registered with in the mapping table.

The agency service 115 may also otherwise notify (e.g., a text message or email) monitoring devices when the mobile bug 105 request to activate a session. The agency service 115 may also notify monitoring devices 107 through the monitoring interface 145 or via text massage or email.

In some embodiments, the agency service 115 includes a bug module 135 which may be provided to the mobile bug 105. The bug module 135 interfaces with the native dialer of the mobile bug 105 to manage connections with a selected virtual number such as the receiving number and/or interfaces with a messaging application of the mobile bug 105 to manage messages with a selected relay 113. Additionally, the bug module 135 may interface with mobile bug 105 software and/or hardware to utilize features such as an image capture device and GPS to collect real-time image or video and position data. The bug module 135 transmits the collected data over the network 120 back to the agency service 115 either continually or periodically (e.g., via the internet 123) or other entity. The agency service 115, in turn, may store the collected data for transmission to one or more monitoring devices 107 and the agency 110. Furthermore, the bug module 135 may be configured with a password or otherwise disguised when executed to prevent users other than the operator from accessing the module altogether and/or particular features that would give away its true nature. The bug module 135 is described in more detail with reference to FIG. 2. In instances where the mobile bug 105 is coupled to telephony network 125A, the bug module 135 may transmit and receive information to/from the agency service 115 in message format via the relay 113.

In some embodiments, the agency service 115 includes a monitoring interface 145 for providing data received from mobile bugs 105 to various monitoring devices 107 and/or appliances 150 over the network 120. For example, the monitoring interface 145 may provide monitoring devices 107 with data or notifications corresponding to the status (e.g., transmitting or disconnected) of one or more mobile bugs 105. In some embodiments, for monitoring devices 107A on telephony network 125A, the monitoring interface 145 may provide the data and notifications to the relay 113 and identify the monitoring device 107A to which the relay 113 should transmit the information. For example, the monitoring interface 145 may format notifications and received data into a message for transmission to the monitoring device 107A (e.g., over telephony network 125A) and provide the message for transmission to the relay 113 (e.g., over internet 123). If the mobile bug 105 is transmitting real-time data, the monitoring interface 145 can stream data such as audio from the active transmission, GPS coordinates with heading, speed and coordinates of last-reported locations for placement on a map, collected image or video data, and the internet protocol address and/or telephone numbers of other personnel monitoring or having access to the mobile bug. In some embodiments, the monitoring interface 145 syncs collected data prior to transmission or includes tags in the transmitted data for synchronization of playback at a monitoring device 107. The monitoring interface 145 can also stream, or provide for download, previously recorded sessions.

In some embodiments, the agency service 115 provides a monitoring module 140 to monitoring devices 107 for accessing the monitoring interface 145. The monitoring module 140 transmits requests associated with provisioning a virtual number and/or registering devices with a virtual number, and receiving real-time data collected by monitored bugs via the relay 113 and/or internet 123. For example, the monitoring module 140 may provide a user interface or status dashboard with options for requesting provisioning virtual numbers, registering a transmitting number of a mobile bug 105 or monitoring device 107 to a given virtual number and PIN information for virtual number. In one embodiment, the dashboard provides an option to toggle a recording session on or off with the agency service 115. When the recording session is disabled, the monitoring device 105 still receives real-time data, but the agency service 115, appliance 150 and provider 127 do not store copies of the collected data.

The monitoring module 140 may also display real-time status information for the mobile bug 105 including current GPS location, tracked GPS location, live audio and image data, mapping table information and other information collected from the mobile bug and streamed by the monitoring interface 145. Similarly, the monitoring module 140 may be used to access and playback historic activity associated with a given virtual number or mobile bug 105. For example, the monitoring module 140 may download files for playback or steam them. In addition to interfacing with the agency service 115, the monitoring module 140 may interface with an appliance 150 that stores (or backs up) collected data within the agency 110. Additionally, the monitoring module 140 may include functionality of the bug module 135 and vice versa.

In instances where the monitoring device 107A is coupled to telephony network 125A, the monitoring module 140 may transmit and receive information to/from the agency service 115 in message format via the relay 113.

Agency 110 represents a collection of servers, desktop, notebook or tablet computers, mobile telephones and related storage mediums used by respective agency personnel for executing applications or modules to communicate with and receive data from the agency service 115 (e.g., via the monitoring interface) and other entities on the network 120. For example, agency 110 devices may execute a web browser to access a web interface or execute a mobile or desktop application for communicating with an API provided by the agency service 115. An agency 110 may also include telephonic and video infrastructure enabling audio and video communicability (e.g., internally and/or over the network 120) using the public switched telephone network ("PTSN"), voice over internet protocol ("VoIP") and video conferencing services for monitoring or specifying configurations for mobile bugs 105.

In one embodiment, the agency 110 includes an appliance 150 for storing data collected by mobile bugs 105. The appliance 150 may utilize the monitoring interface 145 provided by the agency service 115 for updating stored data or receive data directly from mobile bugs 105. Additionally, the appliance 150 may receive audio recorded on a virtual number and associated transcripts from the provider 127 or agency service 115. One example embodiment of the appliance 150 also includes its own monitoring interface (not shown) that enables monitoring devices 107 to access real-time and historic data stored on the appliance for the mobile bug 105. Monitoring interfaces provided by the agency service 115 or appliance 150 may also be accessible via a web browser for streaming or downloading data and include the same or similar options.

Additionally, the appliance 150 and agency service 115 may communicate to intermittently update collected data and records at defined intervals or in response to notifications to download data. During the intervals or notification periods, the agency service 115 may process the data and perform any necessary actions as desired in support of mobile bugs 105 or monitoring device 107 until the data is transferred to the appliance 150. In some embodiments, the agency service 115 maintains a persistent connection with the appliance 150 to facilitate transfer of real-time data collected by mobile bugs 105 operated in the field.

In one embodiment, the agency service 115 ensures that it, and the provider 127, do not possess data collected by mobile bugs 105 beyond the time needed to facilitate transfer. However, in mission critical situations, operators and other agency 110 personnel cannot rely only on the availability of the appliance 150 for storing and maintaining collected data. Consequently, if the appliance 150 is unable to take possession of the collected data or go offline during transfer, the agency service 115 and/or the provider 127 may maintain possession of the collected data until the appliance 150 is functioning. Furthermore, the agency service 115 and/or provider 127 may determine whether checksums, hashes or sizes of transferred data match the appliance's 150 version prior to deleting stored data.

In some embodiments, the agency service 115 maintains an appliance instead of, or in addition to, the agency 110. In such cases, the appliance may exist as a dedicated piece of hardware or remote storage. Alternatively, embodiments of the appliance 150 may be implemented in a cloud computing and storage stack available on the network 120.

Mobile Bug Functionality

Figure 2:
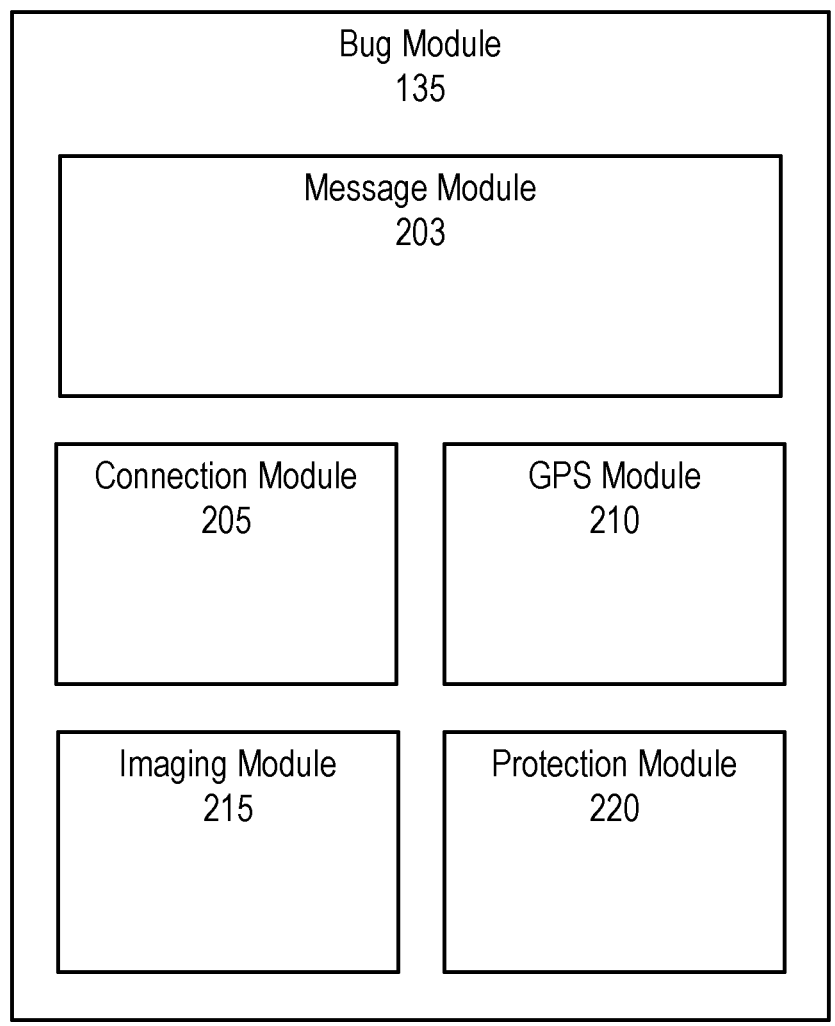
FIG. 2 is a block diagram illustrating a bug module according to one example embodiment.

FIG. 2 is a block diagram illustrating a bug module 135 according to one example embodiment. As mentioned above, the bug module 135 may be downloaded from the agency service 115 to the mobile bug 105 and executed to collect and transmit data to entities on the network 120. As shown in FIG. 2, the bug module 135 itself includes multiple modules. In the embodiment shown in FIG. 2, the bug module 135 includes a message module 203, connection module 205, GPS module 210, imaging module 215, and protection module 220. In some embodiments, the functions are distributed among the modules in a different manner than described herein. Other embodiments have additional and/or other modules.

The message module 203 manages communications between the mobile bug 105 and a specified relay 113. For example, the transmitting number of a relay 113 may be stored at the messaging module 203. In turn, the messaging module 203 may include an interface for viewing messages received from the relay and transmitted to the relay. The messaging module 203 and/or protection module 220 may monitor inbound and outbound messages of the mobile bug 105 and intercept messages to/from the relay such that the messages do not appear in the native messaging application or in visual and/or audible notifications of the mobile bug 105. Additionally, messaging module 203 interface may include a command set to aid users in composing messages to the relay 113. For example, the command set (e.g., "new," "register device," "activate," "stop" or similar) may generate a formatted message including any additional input options for transmission to the relay 113 and configured to, respectively, request a new virtual number, register a device with a virtual number, activate a session, and stop a session when once passed via the relay 113 to the agency service 115. The options to request a virtual number may include an authorization code permitting use of the system and/or desired number information for spoofing the caller ID of the virtual number. The options for registering with the virtual number may include a specified PIN, transmitting number, device identifier, and/or other information describing the device to register.

The connection module 205 manages connections between the mobile bug 105 and a virtual number such as the receiving number mapped to the transmitting number of the mobile bug 105. For example, the operator may move into an area without network service and unknowingly disconnect the mobile bug 105 from the receiving number or otherwise prevent successful transfer of data to an entity on the network. The connection module 205 receives input from the operator including the receiving number associated with the mobile bug 105. If number information for the receiving number has been spoofed, the connection module 205 may receive input for the spoofed number information. In turn, the connection module 205 may automatically identify connection requests from the receiving number (with or without spoofed number information) for activating the mobile bug and automatically accept the connection request to establish or reestablish a connection with the receiving number. For example, the connection module 205 may automatically accept connection requests from the receiving number after a request to activate a session is transmitted to the relay and until a request to stop the session is transmitted to the relay. In one embodiment, once a connection is established through the receiving number after a request to active a session is transmitted, the connection module 205 may detect network disruptions such as dropped calls and automatically instruct the message module 203 to re-request activation of the session without input from the operator of the mobile bug 105. The connection module 205 may further modify a call log associated with the native dialer such that connection requests from the receiving number do not appear in the native dialing application and/or call log.

Depending on the mobile bug's 105 capabilities, the communication module 205 may enable placement/receipt of outgoing and incoming calls (e.g., other than those established by module to the receiving number) during monitoring (e.g., via call waiting features) within the native dialer application or similar. Embodiments of the communication module 205 and/or protection module 220 may suppress visual notifications or queues that the communication module 205 is maintaining a connection through the receiving number. In some instances, the communication module 205 can pass audio from the inbound or outbound call to the call-waiting connection with the receiving number to prevent gaps in audio monitoring.

The GPS module 210 communicates with a native GPS receiver on the mobile bug 105 to receive GPS location data. The GPS module 210 may also communicate with other radio receivers and directional mechanisms (e.g., compass or accelerometers) on the mobile bug 105 to receive additional location data. The GPS module 210 processes the GPS and radio location data to determine and refine an estimated location measurement for the mobile bug 105. The location measurement may include, but is not limited to, latitude, longitude, altitude, heading, speed, associated accuracy measurement and the time and date of recording. The GPS module 210 may transmit the determined location measurement to the agency service 115 via the relay 113 (e.g., in a message transmitted by the message module 203) or via the internet 123. In one embodiment, the GPS module 210 streams the location measurement in real-time via the internet 123 or a collection of locations measurements in intervals (e.g., every 5 minutes) via the relay 113.

The imaging module 215 communicates with a native image sensor on the mobile bug 105 for capturing still images or videos. The imaging module 215 may downsample (e.g., compress) collected image data for transmission based on available bandwidth and/or communication type (e.g., via a message such as an MMS to the relay). High-resolution image data may be stored directly on the device for subsequent transmission as a high-bandwidth connection (e.g., WiFi) becomes available.

In some embodiments, a protection module 220 interfaces with the operating system of the mobile bug 105 to provide options or functionality for concealing operations of the bug module 135 on the mobile bug 105. For example, the protection module 220 provides operators with option to run the bug module 135 in the background and only reveal or access the bug module in response to a specified key-in (e.g., button-press combination, password or other personal identification). In another example, the protection module 220 mimics the look and feel of the native operating system, calling and/or messaging application on the mobile device to conceal use of bug module 135 functionality. However, unlike the native operating system or applications, the protection module 220 provides password protection, locking (e.g., with a key-in) or otherwise visually concealed or protected configuration options and viewing of current call activity for connections established by the communications module 205 and messages in the message module 203 to/from the relay 113.

In some embodiments, the bug module 135 and the modules therein interface and communicate with non-native devices attached to the mobile bug 105. For example, audio, images and locations data can be determined from accessories coupled (e.g., wired microphone or imaging device) or wirelessly connected (e.g., Bluetooth headset) to the mobile bug 105.

Virtual Number Provisioning and Device Registration

Figure 3A:
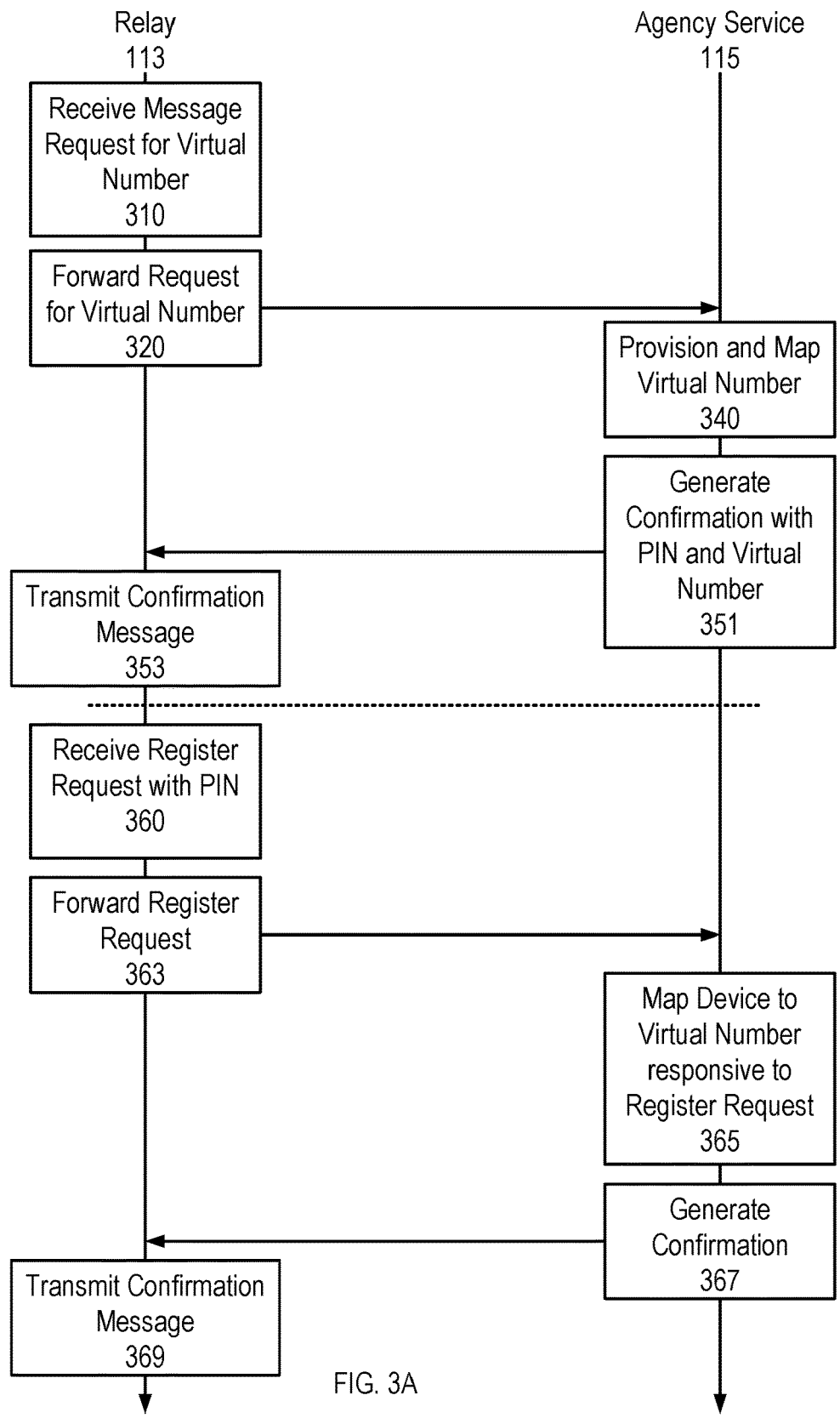
FIG. 3A is an interaction diagram illustrating a method for requesting a virtual number and registering a mobile bug and/or monitoring device with the virtual number through a relay, according to example embodiments.

FIG. 3A is an interaction diagram illustrating a method for requesting a virtual number and registering a mobile bug and/or monitoring device with the virtual number through a relay 113, according to example embodiments. The relay 113 receives 310 a message requesting a virtual number for operating a mobile bug 105 (e.g., a message with message content "new"). The message may originate from a telephonic device such as the mobile bug 105 or monitoring device 107. The relay 113 forwards 320 the message requesting the virtual number to the agency service 115. The forwarded message may include the original message such that the agency service 115 may inspect original header information in addition to message content. In some embodiments, the message content includes an authorization code that when authenticated by the agency service 115 permits the requesting device to obtain a virtual number for utilizing the system.

In some embodiments, because the relay 113 may receive messages from any device capable of messaging the relay, the authorization code ensures that only requests for a new virtual number for operating a mobile bug 105 that include an approved authorization code are processed by the agency service 115. An example request including an authorization code may include a message with message content "new [authorization code]". The request may further include spoofed number information for the virtual number, such that the caller ID of the virtual number when dialing out to telephonic devices differs from the virtual number itself.

Additionally, unique authorization codes may be assigned to different agencies and/or system accounts to track billing/reporting, or in the event that multiple agencies share the same relay 113, indicate to which agency a virtual number for operating a mobile bug belong. For example, Agency A may utilize the same relay 113 as Agency B over telephony network 125A in Colombia, but Agency A may request a virtual number for operating a mobile bug with "new 1111" and Agency B with "new 2222".

The agency service 115 provisions 340 a virtual number and maps the virtual number to one or more PINs. For example, a transmitting PIN for a mobile bug and monitoring PIN for a monitoring device may be mapped to the virtual number. Alternatively, a generic PIN may be generated, which may simply be the virtual number. The agency service 115 generates 353 a confirmation message including the one or more PINs and the virtual number (or spoofed number information specified for the virtual number), which is passed to the relay 113 with instructions for transmitting the confirmation message to the device having originated the request. The agency service 115 and/or relay 113 may identify the originating device from the original header information of the message requesting the virtual number. In turn, the relay 113 transmits 353 the confirmation message to the device having originated the request. The user of the device having originated the request may pass PIN(s), and/or relay information to other users for registration of devices with the virtual number. Additionally, the user of the device having originated the request may provide other users with the virtual number (or spoofed number information for the virtual number) such that mobile bug and/or monitoring device users may store the virtual number or the spoofed number information on their devices or visually identify connection requests associated with operating a mobile bug or monitoring device. In the case of a mobile bug, the virtual number or spoofed number information for the virtual number may be stored in a bug module to automate acceptance of connection requests for activating the mobile bug.

With a virtual number provisioned and mapped 340 by the agency service 115, a device may request to register with the virtual number through the relay 113. The relay 113 receives 360 a message requesting to register with a virtual number for operating a mobile bug 105 or monitoring device 107. The message may originate from a telephonic device such as the mobile bug 105 or monitoring device 107. The relay 113 forwards 363 the message requesting to register the device with the virtual number to the agency service 115. The forwarded message may include the original message such that the agency service 115 may inspect original header information in addition to message content. The message content may include a mobile bug or monitoring device specific PIN or a generic PIN with device identifier (e.g., mobile bug or monitor) identifying the requesting device as either a monitoring device or the mobile bug for registration. In some embodiments, the generic PIN is the virtual number. The header information includes device information such as the transmitting number of the device originating the request. In some embodiments, the message content may include a transmitting number of a device to register such that a given device may register another device with the virtual number. The agency service 115 identifies the virtual number mapped to the PIN included in the message content from the mapping table. The agency service 115 identifies whether the device for registration is a monitoring device or mobile bug based on the PIN and/or device identifier in the message content. The agency service 115 identifies device information for the device to register from the original header information or the message content.

The agency service 115 maps 365 the identified device information to the identified virtual number to register a mobile bug or monitoring device with the virtual number. The mapping 365 may include the device identifier (e.g., in instances where a generic PIN is utilized). In instances where unique PINs are ascribed to the mobile bug and monitoring devices, the PIN may serve as a device identifier.

The agency service 115 generates 367 a confirmation message indicating successful registration of the identified device to the identified virtual number as either the mobile bug or a monitoring device, which is passed to the relay 113 with instructions for transmission to the device having originated the request. In turn, the relay 113 transmits 369 the confirmation message to the device having originated the request. In configurations where the device originating the request differs from the device indicated for registration (e.g., by device information in message content), an additional confirmation message may be generated and transmitted to the device that was registered.

Figure 3B:
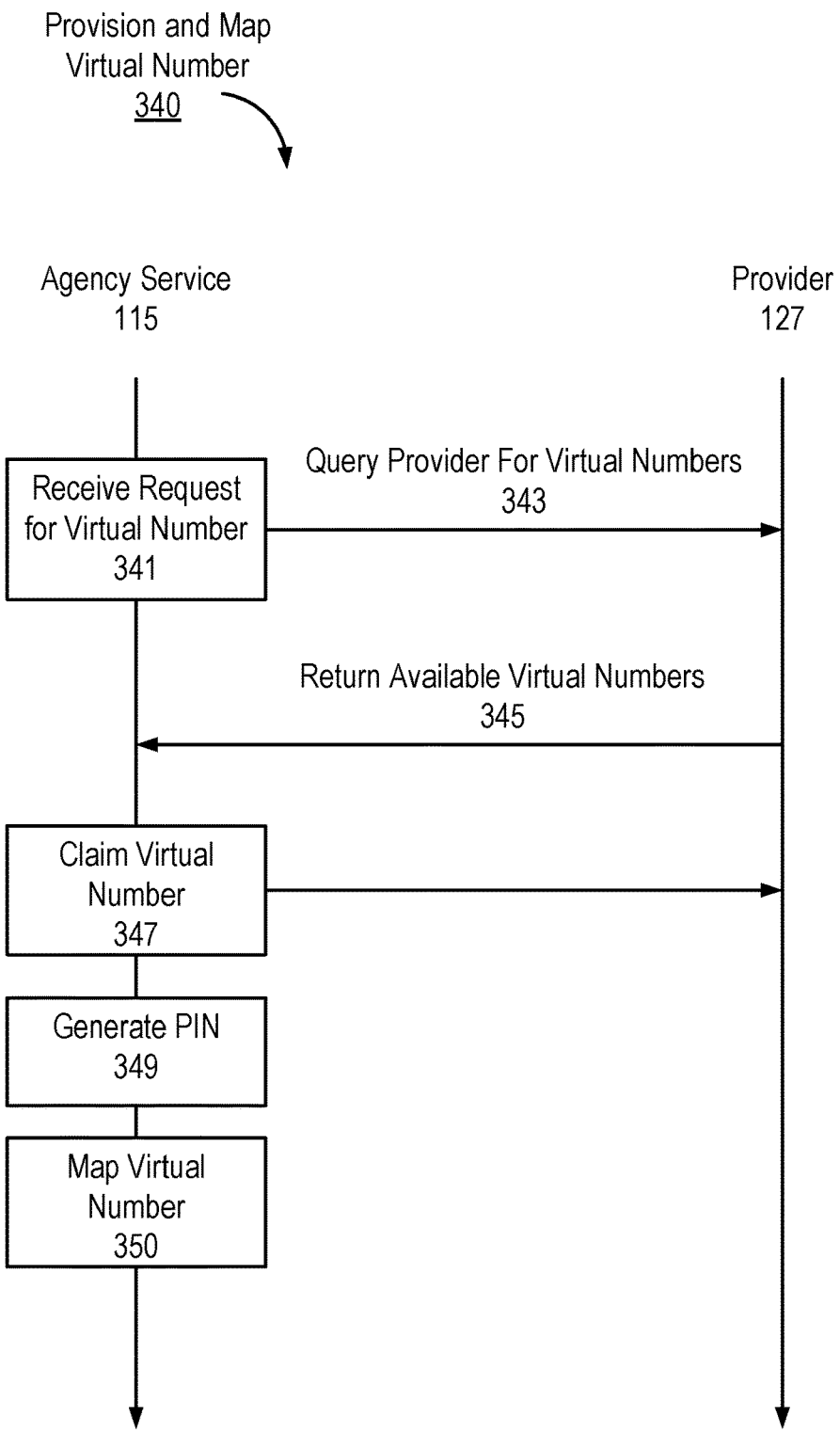
FIG. 3B is an interaction diagram illustrating a method for provisioning and mapping virtual numbers for operating and monitoring a mobile bug according to one example embodiment.

FIG. 3B is an interaction diagram illustrating a method for provisioning 340 and mapping virtual numbers for operating and monitoring a mobile bug according to one example embodiment. Initially, the agency service 115 receives 341 a request for provisioning a virtual number from a monitoring device 107, mobile bug 105, or other entity. The request for provisioning 341 the virtual number may be received from a relay 113 and originate from, for example, a monitoring device 107 or mobile bug 105. The agency service 115 may determine number information such as an area code and/or country code for provisioning the virtual number based on number information in the request such as the number information associated with the device that originated the request, number information specified in the request, or number information associated with the relay.

The agency service 115 queries 343 the provider for virtual numbers matching the determined number information for provisioning the virtual number. The provider 127 returns 345 a list of available virtual numbers to the agency service 115 matching the specified number information to the agency service 115. If no matching virtual numbers are available, such as in instances where a relay 113 supports communications with a telephony network other than those associated with the provider, the agency service 115 may request available virtual numbers from the provider that need not match the specific number information. The agency service 115 claims 347 a virtual number from the provider 127. The agency service 115 may optionally modify corresponding ANI and caller identification information for the virtual number based on instructions from the requesting device or via the interface. The agency service 115 subsequently stores the modified virtual number information and instructs the provider 127 to update the associated virtual number information.

With a virtual number claimed, the agency service 115 generates 349 one or more PINs and maps 350 the PINs to the virtual number. For example, the agency service 115 may generate and map a transmitting PIN for registering a mobile bug 105 with the virtual number to operate the virtual number as a receiving number for the mobile bug. Additionally, the agency service 115 may generate and map a monitoring PIN for registering monitoring devices 107 with the virtual number to permit monitoring of the mobile bug.

In some embodiments, the agency service 115 may prompt the requesting device to provide the PIN or modify an automatically generated PIN. For example, the agency service 115 may generate a message for transmission to the requesting device by the relay 113 with "reply to specify a transmitting PIN and/or monitoring PIN e.g., [transmitting PIN] [monitoring PIN]" or similar. In turn, the relay 113 passes a reply received to the message to the agency service 115 which maps the PIN(s). The agency service 115 may identify the reply as associated with the request by the matching header information of the requesting device transmitting messages to the relay. The agency service 115 may confirm success of PIN mapping in a confirmation message passed to the requesting device via the relay.

Alternatively, the agency service 115 may map the generated PINs and include in a confirmation message passed by the relay to the requesting device "Transmit PIN: [T1111] monitor PIN: [M2222] reply to specify a custom transmitting PIN and/or monitoring PIN e.g., [transmitting PIN] [monitoring PIN]" or similar. Accordingly, the user of requesting device may reply to alter a automatically generated PIN and subsequently receive a confirmation from the agency service 115 via the relay.

FIGS. 3C and 3D are tables illustrating example embodiments of virtual number mapping 350 to PINs for operating and monitoring a mobile bug. As shown in FIG. 3C, mapping table 370A includes a mapping 340 of provisioned virtual numbers as receiving numbers for operating and monitoring a mobile bug. Each receiving number 373 is mapped to a generated PIN. The agency service 115 may store a virtual number as a receiving number 373 in the mapping table 370A once the virtual number has been provisioned with a provider 127. In turn, according to an example embodiment, the agency service 115 generates a unique transmitting PIN 371 and monitoring PIN 375 that are mapped to the receiving number 373. Thus, a registration request including a transmitting PIN 371 (e.g., T12345) identifies a device for registration as the mobile bug with the corresponding receiving number 373 (e.g., +44 555-111-2222) in the mapping table 370A. For example, the agency service 115 may receive a registration request originating from a telephonic device with a transmitting number of "555-555-5555" including the PIN "T12345" to register the telephonic device as the mobile bug with receiving number "+44 555-111-2222." Similarly, a registration request including a monitoring PIN 375 (e.g., M12345) identifies a device for registration as a monitoring device of the corresponding receiving number 373 (e.g., +44 555-111-2222) in the mapping table 370A. For example, the agency service 115 may receive a registration request originating from a telephonic device with a transmitting number of "555-666-6666" including the PIN "M12345" to register the telephonic device as a monitoring device with receiving number "+44 555-111-2222."

FIG. 3D is a table illustrating an example embodiment of virtual number mapping 365 to devices for operating and monitoring a mobile bug 105. Mapping table 370B includes a receiving number 373 mapped to a mobile bug and a monitoring device in response to the above example registration requests. In some embodiments, the information of mapping tables 370A, 370B may be maintained in a single mapping table, although they are illustrated separately for ease of explanation.

As shown in mapping table 370B, receiving number 373 "+44 555-111-2222" is mapped to the device information 378, i.e., transmitting number "555-555-5555" of the mobile bug that originated the registration request including transmitting PIN 371 "T12345." The mapping table 370B may include the PIN 377 (e.g., "T12345") a device was registered with to identify whether the device is a mobile bug or monitor device. Alternatively, the mapping table 370B may include an explicit device ID 379 mapping, e.g., "bug" to identify the stored device information 378 (e.g., transmitting number "555-555-555") as that of the mobile bug. The Device ID 379 may be included in instances where a mobile bug and monitoring devices register with a generic PIN and identify their device ID in the registration request.

A monitoring device may register in a similar fashion as the mobile bug, and a mapping thereof in accordance with the above example registration request is illustrated in mapping table 370B for a monitoring device with device information 378 including the transmitting number "555-666-6666." Thus, the receiving number 373 "+44 555-111-2222" is mapped to the device information 378 "555-666-6666" of the monitoring device, and the monitoring device may be identified based on the PIN 377 "M12345" or explicit device ID 379 "Monitor".

Requesting to Activate a Session

Figure 4A:
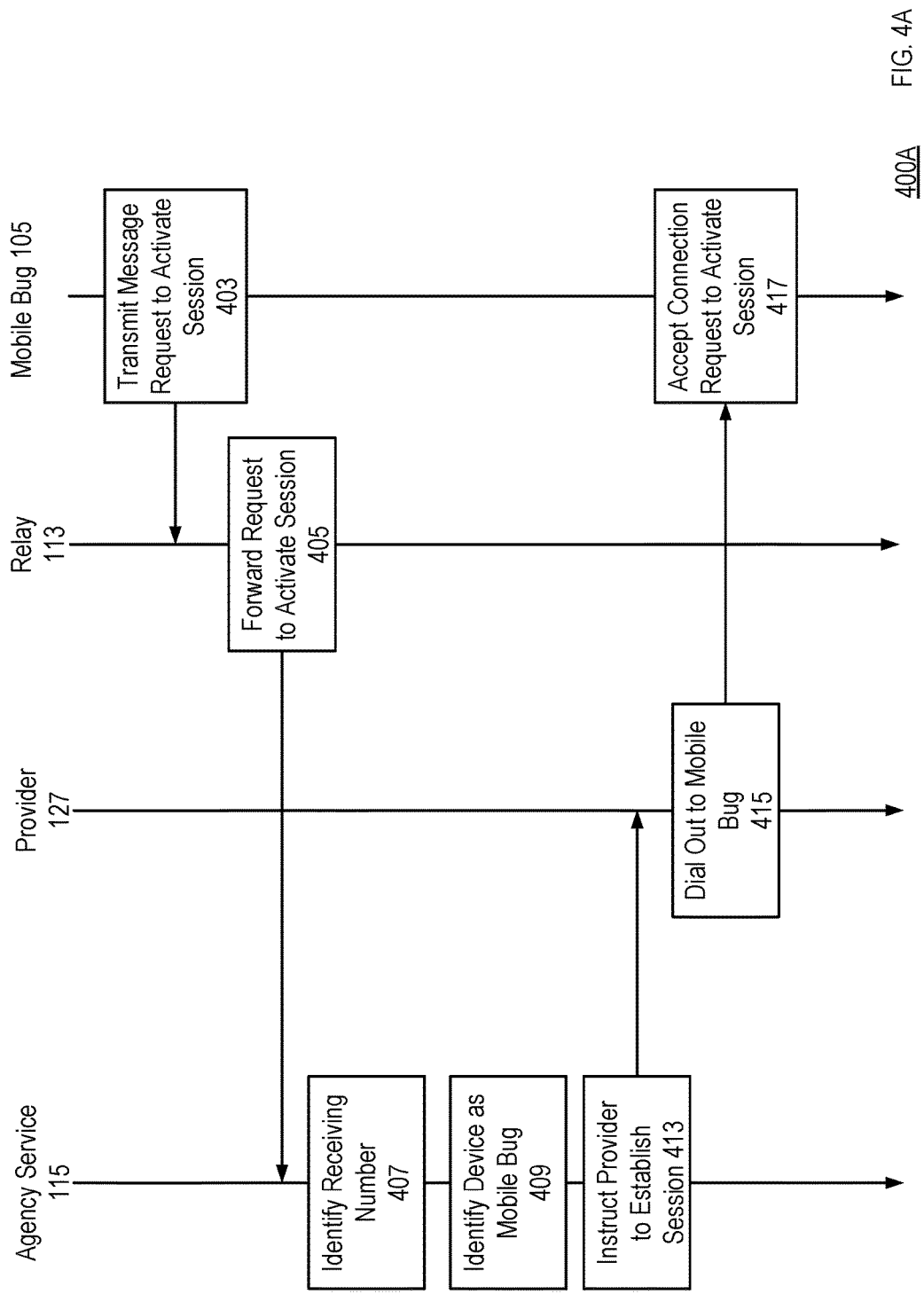
FIG. 4A is an interaction diagram illustrating a method for activating a mobile bug through a relay according to one example embodiment.

FIG. 4A is an interaction diagram illustrating a method for activating 400A a mobile bug through a relay according to one example embodiment. Once a virtual number is provisioned as a receiving number, and the mobile bug 105 registered with the receiving number, the mobile bug 105 may transmit 403 a message requesting to activate a session 403 where activities of the mobile bug 105 are monitored. In an embodiment, the message is a message on a SMS. The mobile bug 105 may transmit 403 the request to activate the session to a relay 113. In turn, the relay 113 forwards 405 the message requesting to activate the session to the agency service 115.

The agency service 115 identifies device information such as a transmitting number for the mobile bug 105 from the forwarded request. For example, the agency service 115 may identify the transmitting number in header information of the original message. In turn, the agency service 115 identifies a receiving number 407 associated with the device information in a mapping table. Additionally, the agency service 115 identifies the device as the mobile bug 409 based on a PIN (e.g., transmitting PIN) and/or device ID (e.g., bug) stored in association with the identified device information and/or the identified receiving number in the mapping table.

The agency service 115 instructs 413 the provider to establish a session with the mobile bug through the receiving number. For example, the agency service 115 instructs the provider 127 to dial out 415 to the transmitting number of the mobile bug 105 from the identified receiving number. Additionally, the agency service 115 instructs the provider 127 to disable outbound audio to the mobile bug 105.

In turn, the mobile bug 105 receives a connection request from the receiving number (which may be configured with spoofed number information) and may accept 417 the connection request to activate the session. Once the session is active, the mobile bug 105 transmits collected audio data to the receiving number which may be monitored by one or more monitoring devices. Additionally, the mobile bug 105 may transmit real-time data such as GPS and image data either via an internet connection or via messages through the relay 113 to the agency service 115.

Requesting to Monitor a Session

Figure 4B:
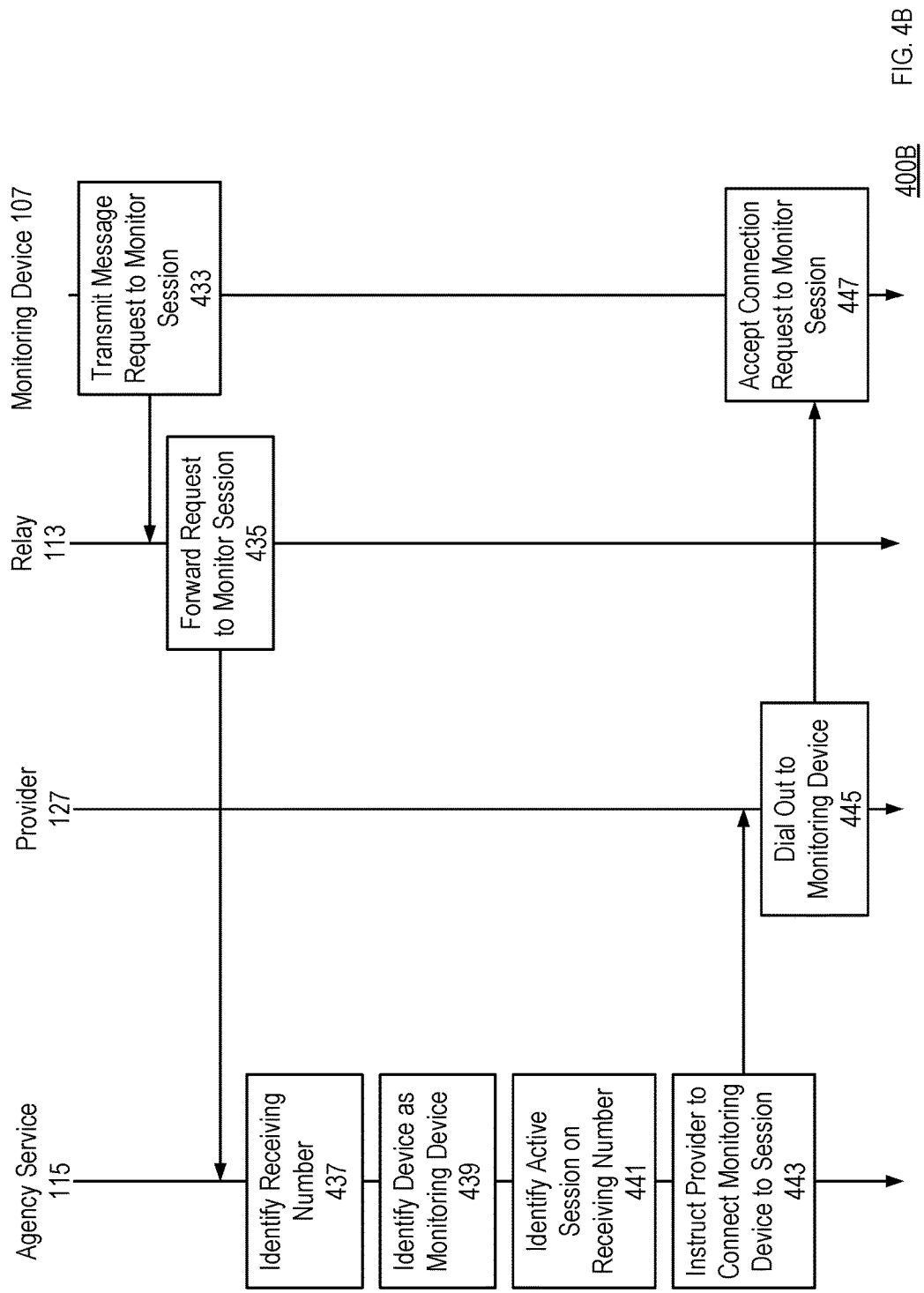
FIG. 4B is an interaction diagram illustrating a method for monitoring a mobile bug with a monitoring device according to one example embodiment.

FIG. 4B is an interaction diagram illustrating a method for monitoring a mobile bug with a monitoring device according to one example embodiment. Once a virtual number is provisioned as a receiving number and the monitoring device 107 registered with the receiving number, the monitoring device 107 may transmit 433 a message requesting to monitor a session 433 corresponding to a period of monitored activities of the mobile bug 105. In an embodiment, the message is a message on a SMS. The monitoring device 1075 may transmit 403 the request to monitor the session to a relay 113. In turn, the relay 113 forwards 405 the message requesting to monitor the session to the agency service 115.

The agency service 115 identifies device information such as a transmitting number for the monitoring device 107 from the forwarded request. For example, the agency service 115 may identify the transmitting number in header information of the original message. In turn, the agency service 115 identifies a receiving number 437 associated with the device information in a mapping table. Additionally, the agency service 115 and identifies the device as the monitoring device 439 based on a PIN (e.g., monitoring PIN) and/or device ID (e.g., monitor) stored in association with the identified device information and/or the identified receiving number in the mapping table.

The agency service 115 identifies 441 whether a mobile bug 105 has established an active session on the receiving number. If no session is active, the agency service 115 may delay proceeding to step 443 until a session in active. Alternatively, the agency service 115 may proceed to step 443 regardless of whether a session with a mobile bug is active.

In some embodiments, a monitoring device 107 registered with the receiving number need not request 433 to monitor a session. Specifically, the agency service 115 may identify 441 when a session is active on a receive number and, in turn, identify the device information for monitoring devices such as the transmitting numbers of registered monitoring devices associated with the receiving number in the mapping table, and proceed to step 443.

At step 443, the agency service 115 instructs 443 the provider 127 to connect a monitoring device 107 to a session. For example, the agency service 115 may instruct 443 the provider to dial out 445 to the transmitting number of the monitoring device 107 from the receiving number.

In turn, the monitoring device 107 receives a connection request from the receiving number (which may be configured with spoofed number information) and may accept 447 the connection request to monitor the session. Once the session is active, the monitoring device 107 receives the collected audio data transmitted to the receiving number by the active mobile bug. Additionally, the monitoring device 107 may receive real-time data such as GPS and image data either via an internet connection or via messages from the agency service 115 received through the relay 113.

Operating an Activated Mobile Bug

Figure 5:
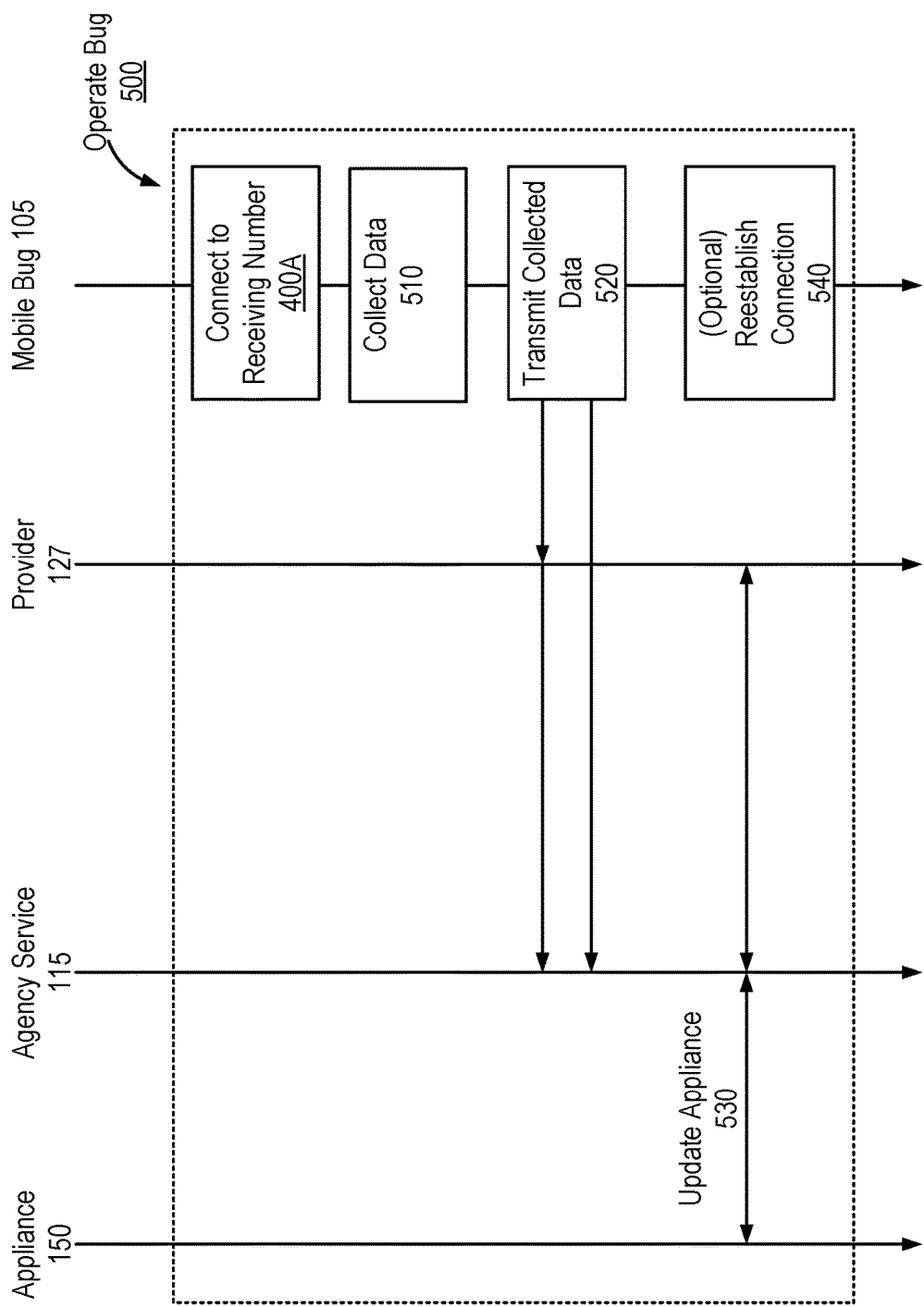
FIG. 5 is an interaction diagram illustrating a method for operating a mobile bug according to one example embodiment.

FIG. 5 is an interaction diagram illustrating a method for operating 500 a mobile bug according to one example embodiment. Once the connection 400A between the mobile bug 105 and the receiving number is established, the provider 127 records audio on the line from the mobile bug. One or more of the illustrated steps may be performed automatically by a bug module executed on the mobile bug and/or performed manually by an operator of the mobile bug.

The mobile bug 105 collects 510 audio data using a microphone coupled to the mobile bug. The mobile bug 105, in turn, transmits 520 the collected audio data to the provider 127 by way of the connection established through the receiving number. The provider 127, in addition to enabling monitoring devices 107 to monitor the mobile bug through the receiving number, transmits the audio data received from the mobile bug 105 to the agency service 115 or appliance 150 over the network 120.

The mobile bug 105 may also collect 510 image data using an image sensor coupled to the mobile bug. The mobile bug 105, in turn, transmits 520 the collected image data to the agency service 115. In some embodiments, the mobile bug 105 may transmit 520 the collected image data in a message to the relay (not shown), which forwards the message with the collected image data to the agency service 115 for processing. In some embodiments, the mobile bug 105 downsamples collected image data such that mobile bug 105 can stream image or video in real-time.

Furthermore, the mobile bug 105 may also collect 510 location data from GPS receivers and other direction mechanism coupled to the mobile bug. The mobile bug 105 determines a location measurement including the position of the mobile bug, direction and speed of the mobile bug and associated accuracy of the measurement. The mobile bug 105 transmits 520 the location measurement to the agency service 115. In some embodiments, the mobile bug 105 determines and transmits 520 the location measurements in real-time to the agency service 115. In some embodiments, the mobile bug 105 may transmit 520 one or more location measurements at defined intervals (e.g., every 5 minutes) in a message to the relay (not shown), which forwards the message with the location measurements to the agency service 115 for processing.

In some instances, the connection 400A between the mobile bug 105 and the receiving number (e.g., via the provider 127) or the agency service 115 may be terminated or timeout. In the case of a disconnection from the receiving number, in one embodiment the mobile bug 105 attempts to reestablish 540 the terminated connection automatically in the background by transmitting a request to activate a session as described with reference to FIG. 4A. In some embodiments, the mobile bug 105 may automatically receive a request to reestablish a connection and/or request a connection until requesting to stop the session. In either instance, the mobile bug 105 may automatically accept a connection request from the receiving number to maintain a persistent connection during an active session.

In one embodiment, the mobile bug transmits 520 data collected during disconnect periods in the background. For example, while the provider 127 typically handles audio data via the receiving number, the agency service 115 may receive any audio data collected during disconnect periods when an internet connection is and/or becomes available. Accordingly, the agency service 115 may update 530 the appliance 150 with the received audio data. The agency service 115 or provider 127 can also update 530 the appliance with any other data received from the provider 127 and/or mobile bug 105 via the relay or internet.

Monitoring an Activated Mobile Bug

FIG. 6 is an interaction diagram illustrating a method for monitoring 600 a mobile bug according to one example embodiment. As described above, the agency service 115 receives 610B collected data from the mobile bug (e.g., via the internet and/or relay) and/or the provider 127. Additionally, the provider 127 may receive data 610A from the mobile bug 105. In turn, the agency service 115 and/or provider 127 may update 530 the appliance at the agency 110. A monitoring device 107 may subsequently monitor 600A, 600B the mobile bug 105 using one or both of the processes outlined below.

In one embodiment, the monitoring device 107 connects 400B to a receiving number for monitoring 600A the mobile bug 105. The monitoring device 107 may be connected 400B by answering an incoming call from the receiving number initiated by the provider 127 once registered with the receive number.

Once the connection between the monitoring device 107 and the receiving number is established, the monitoring device 640 receives the live audio transmitted by the mobile bug through the receiving number. To continue monitoring 600A the mobile bug 107, the monitoring device 107 simply maintains the connection 400B with the receiving number. Additionally, the monitoring device 107 may receive messages from the agency service 115 via the relay including the received data 610B from the mobile bug and/or provider, which may include some or all of the information described below with reference to monitoring process 600B.

In another embodiment, the monitoring device 107 connects 650 to the agency service 115 and/or appliance 150 for monitoring 600B the mobile bug 105. The monitoring device 107 may establish the connection 650 using a web browser or monitoring module 140 that retrieves or streams collected data via a monitoring interface on the appliance 150 or agency service 115 (e.g., monitoring interface 145).

In one example embodiment, the monitoring device 107 streams 660 image, audio and/or location measurements in real-time from the agency service 115. In addition, the monitoring device 107 can retrieve 670 historical data stored on the appliance 150 to view previous mobile bug 105 operating sessions 500. In some embodiments, the appliance 150 also supports real-time monitoring.

In some instances, the monitoring device 107 receives notifications from the monitoring interface 145 for display in the web browser or with the monitoring module 140. Example notifications include audio or visual alerts for notifying personnel if the mobile bug 105 stops transmitting real-time data to the receiving number, appliance 150 or agency service 115. If the mobile bug 105 reestablishes a connection, the monitoring device 107 may also receive notifications when real-time data streaming has resumed or when data collected by the mobile bug 105 during the disconnected period becomes available. As described above, some or all of the data 660, 670 and notifications may be received from the agency service 115 via the relay.

SUMMARY

The foregoing description of the embodiments has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A computer based method for configuring a telephonic device as a one-way recorded transmitter (mobile bug), the method comprising:
   provisioning, by a server, a virtual number as a receiving number;
   generating, by the server, without user input as to a personal identification number (PIN), the PIN for registering a telephonic device as a mobile bug, the generated PIN stored in association with the receiving number in a mapping table, the generated PIN being unique to the telephonic device relative to other PINs generated for other telephonic devices;
   receiving, by the server, a registration request, the registration request comprising the PIN and a transmitting number of the telephonic device to register as the mobile bug;
   in response to receiving the registration request, identifying, by the server, the PIN included in the registration request within the mapping table and associating the transmitting number included in the registration request with the PIN and the receiving number in the mapping table to register the telephonic device as the mobile bug;
   receiving, by the server, an activation request message, the activation request message relayed from a message service and including the transmitting number of the telephonic device registered as the mobile bug; and
   in response to receiving the activation request message, identifying, by the server, the receiving number stored in association with the transmitting number of the mobile bug in the mapping table, and transmitting, by the server, instructions for:
   dialing out to the mobile bug from the identified receiving number for establishing a connection to the mobile bug through the receiving number to permit monitoring of the mobile bug; and
   disabling outgoing audio from the receiving number to the mobile bug on the connection.

2. The method of claim 1, wherein generating a personal identification number (PIN) further comprises:
   generating the PIN as a transmitting PIN for registering the telephonic device as the mobile bug and additionally generating a monitoring PIN for registering a monitoring device; and
   associating the monitoring PIN with the receiving number.

3. The method of claim 2, wherein receiving a registration request, the registration request comprising the PIN and a transmitting number of the mobile bug further comprises:
   identifying the PIN in the mapping table as the transmitting PIN or the monitoring PIN;
   in response to identifying the PIN as the transmitting PIN, identifying the transmitting number of the telephonic device as corresponding to the mobile bug; and
   associating the transmitting number of the mobile bug with the transmitting PIN and the receiving number in the mapping table to identify the transmitting number as corresponding to the mobile bug in the mapping table.

4. The method of claim 2, further comprising:
   receiving a second registration request, the second registration request comprising a second PIN and a second transmitting number of a second telephonic device:
   identifying the second PIN in the mapping table as the transmitting PIN or the monitoring PIN;
   in response to identifying the second PIN as the monitoring PIN, identifying the second transmitting number as corresponding to the monitoring device; and
   associating the second transmitting number of the monitoring device with the monitoring PIN and the receiving number in the mapping table to identify the second transmitting number as corresponding to the monitoring device.

5. The method of claim 4, further comprising, in response to receiving the activation request message:
   identifying the transmitting number of the monitoring device stored in association with the receiving number in the mapping table, and transmitting instructions for:
   establishing a second connection, the second connection established with the monitoring device through the receiving number to permit the monitoring device to monitor the mobile bug; and
   passing audio received from the mobile bug on the first connection established through the receiving number to the second connection established with the monitoring device through the receiving number.

6. The method of claim 1, further comprising receiving from a relay configured to forward messages received from telephonic devices on the message service:
   the registration request; and
   the activation request.

7. The method of claim 6, wherein the relay receives the messages from telephonic devices on a short message service.

8. The method of claim 1, further comprising transmitting, to a relay configured to forward messages to telephonic devices on a short message service:
   a first message comprising the receiving number and the PIN in response to associating the receiving number with the PIN in the mapping table; and
   a second message comprising a registration confirmation in response to associating the transmitting number of the mobile bug with the PIN and the receiving number in the mapping table.

9. The method of claim 1, further comprising providing a bug module to the mobile bug, the bug module configured to interface with the telephonic device and comprising computer program code for:

receiving a transmitting number of a relay;
intercepting messages received from the relay based on the transmitting number of the relay, the intercepted messages not appearing in a native messaging application; and
suppressing notifications on the mobile for intercepted messages.

10. The method of claim 1, further comprising providing a bug module to the mobile bug, the bug module configured to interface with the telephonic device and comprising computer program code for:
receiving the receiving number;
intercepting connection requests from the receiving number, the intercepted connection requests not appearing in a call log on the mobile bug;
suppressing notifications on the mobile for intercepted connection requests from the receiving number; and
automatically establishing a connection with the receiving number in response to intercepting a connection request.

11. A system for configuring a telephonic device as a one-way recorded transmitter (mobile bug), the system comprising:
a server comprising a processor and a non-transitory computer-readable storage medium, the non-transitory computer-readable storage medium comprising instructions that when executed cause the processor to:
provision a virtual number as a receiving number;
generate, without user input as to a personal identification number (PIN), the PIN for registering a telephonic device as a mobile bug, the generated PIN stored in association with the receiving number in a mapping table, the generated PIN being unique to the telephonic device relative to other PINs generated for other telephonic devices;
receive a registration request, the registration request relayed from a message service and comprising the PIN and a transmitting number of the telephonic device to register as the mobile bug;
in response to receipt of the registration request, identify the PIN included in the registration request within the mapping table and associate the transmitting number included in the registration request with the PIN and the receiving number in the mapping table to register the telephonic device as the mobile bug;
receive an activation request message, the activation request message including the transmitting number of the telephonic device registered as the mobile bug; and
in response to receiving the activation request message, identify the receiving number stored in association with the transmitting number of the mobile bug in the mapping table, and transmit instructions to:
dial out to the mobile bug from the identified receiving number to establish a connection to the mobile bug through the receiving number to permit monitoring of the mobile bug; and
disable outgoing audio from the receiving number to the mobile bug on the connection.

12. The system of claim 11, wherein generating a personal identification number (PIN) further comprises:
generating the PIN as a transmitting PIN for registering the telephonic device as the mobile bug and additionally generating a monitoring PIN for registering a monitoring device;
and
associating the monitoring PIN with the receiving number.

13. The system of claim 12, wherein receiving a registration request, the registration request comprising the PIN and a transmitting number of the mobile bug further comprises:
identifying the PIN in the mapping table as the transmitting PIN or the monitoring PIN;
in response to identifying the PIN as the transmitting PIN, identifying the transmitting number of the telephonic device as corresponding to the mobile bug; and
associating the transmitting number of the mobile bug with the transmitting PIN and the receiving number in the mapping table to identify the transmitting number as corresponding to the mobile bug in the mapping table.

14. The system of claim 12, further comprising instructions that when executed cause the processor to:
receive a second registration request, the second registration request comprising a second PIN and a second transmitting number of a second telephonic device:
identify the second PIN in the mapping table as the transmitting PIN or the monitoring PIN;
in response to identifying the second PIN as the monitoring PIN, identify the second transmitting number as corresponding to the monitoring device; and
associate the second transmitting number of the monitoring device with the monitoring PIN and the receiving number in the mapping table to identify the second transmitting number as corresponding to the monitoring device.

15. The system of claim 14, further comprising instructions that when executed cause the processor to, in response to receiving the activation request message:
identify the transmitting number of the monitoring device stored in association with the receiving number in the mapping table, and transmit instructions to:
establish a second connection, the second connection established with the monitoring device through the receiving number to permit the monitoring device to monitor the mobile bug; and
pass audio received from the mobile bug on the first connection established through the receiving number to the second connection established with the monitoring device through the receiving number.

16. The system of claim 11, wherein the registration request and the activation request are received from a relay configured to forward messages received from telephonic devices on the message service.

17. The system of claim 16, wherein the relay receives the messages from telephonic devices on a short message service.

18. The system of claim 11, further comprising transmitting, to a relay configured to forward messages to telephonic devices on a short message service:
a first message comprising the receiving number and the PIN in response to associating the receiving number with the PIN in the mapping table; and
a second message comprising a registration confirmation in response to associating the transmitting number of the mobile bug with the PIN and the receiving number in the mapping table.

19. The system of claim 11, further comprising transmitting a bug module to the mobile bug, the bug module configured to interface with the telephonic device and comprising computer program instructions that when executed by the mobile bug cause the mobile bug to:

receive a transmitting number of a relay;

intercept messages received from the relay based on the transmitting number of the relay, the intercepted messages not appearing in a native messaging application; and suppress notifications on the mobile for intercepted messages.

20. The system of claim 11, further comprising transmitting a bug module to the mobile bug, the bug module configured to interface with the telephonic device and comprising computer program instructions that when executed by the mobile bug cause the mobile bug to:

receive the receiving number;

intercept connection requests from the receiving number, the intercepted connection requests not appearing in a call log on the mobile bug;

suppress notifications on the mobile for intercepted connection requests from the receiving number; and automatically establish a connection with the receiving number in response to intercepting a connection request.

\* \* \* \* \*